(12) United States Patent
Tanaka

(10) Patent No.: US 9,185,308 B2
(45) Date of Patent: Nov. 10, 2015

(54) IMAGING APPARATUS AND IMAGING METHOD

(71) Applicant: FUJIFILM Corporation, Tokyo (JP)

(72) Inventor: Seiji Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 118 days.

(21) Appl. No.: 13/801,880

(22) Filed: Mar. 13, 2013

(65) Prior Publication Data

US 2013/0194457 A1 Aug. 1, 2013

Related U.S. Application Data

(63) Continuation of application No. PCT/JP2011/061559, filed on May 19, 2011.

(30) Foreign Application Priority Data

Sep. 14, 2010 (JP) .................. 2010-206107

(51) Int. Cl.
*H04N 5/262* (2006.01)
*H04N 5/232* (2006.01)
*H04N 5/235* (2006.01)
*G03B 7/093* (2006.01)
(Continued)

(52) U.S. Cl.
CPC .............. *H04N 5/2625* (2013.01); *G03B 7/093* (2013.01); *H04N 5/2329* (2013.01); *H04N 5/2353* (2013.01); *H04N 5/2355* (2013.01); *H04N 5/2356* (2013.01); *H04N 5/23293* (2013.01); *H04N 5/3532* (2013.01); *H04N 5/3535* (2013.01); *H04N 5/35581* (2013.01)

(58) Field of Classification Search
CPC ............ H04N 5/2329; H04N 5/23293; H04N 5/2355; H04N 5/2352; H04N 5/2353; H04N 5/3532; H04N 5/3535; H04N 5/2625
See application file for complete search history.

(56) References Cited

U.S. PATENT DOCUMENTS 7,386,228 B2 * 6/2008 Okada ........................... 396/238
8,081,220 B2 * 12/2011 Kawai ....................... 348/208.12
8,848,097 B2 * 9/2014 Makii ............................ 348/362

(Continued)

FOREIGN PATENT DOCUMENTS

JP  2003-69897 A  3/2003
JP  2005-117395 A  4/2005

(Continued)

OTHER PUBLICATIONS

Japanese Office Action, dated Sep. 17, 2013, for Japanese Application No. 2012-533888 with an English translation.

*Primary Examiner* — Timothy J Henn
(74) *Attorney, Agent, or Firm* — Birch, Stewart, Kolasch & Birch, LLP

(57) ABSTRACT

The device control section 8 continuously performs a plurality of times of imaging by the imaging element 5. Whenever each of the plurality of times of imaging is terminated, if the terminated imaging is the first time of imaging, the encoder 15 causes the image obtained with the imaging to be displayed on the display section 14, and if the terminated imaging is the second and subsequent imaging, the encoder 15 causes the synthetic image of the image obtained with the second and subsequent imaging and the image obtained all imaging prior to the second and subsequent imaging among the plurality of times of imaging to be displayed on the display section 14.

24 Claims, 12 Drawing Sheets

(51) Int. Cl.
*H04N 5/353* (2011.01)
*H04N 5/355* (2011.01)

(56) References Cited

U.S. PATENT DOCUMENTS

| | | |
|---|---|---|
| 2005/0190274 A1 | 9/2005 | Yoshikawa et al. |
| 2006/0157760 A1* | 7/2006 | Hayashi et al. ............... 257/293 |
| 2007/0103562 A1 | 5/2007 | Kaneko et al. |
| 2007/0230939 A1 | 10/2007 | Tanaka et al. |
| 2008/0044170 A1* | 2/2008 | Yap et al. ...................... 396/52 |
| 2008/0094482 A1 | 4/2008 | Yoshimura |
| 2008/0122969 A1* | 5/2008 | Alakarhu ...................... 348/362 |
| 2008/0170848 A1 | 7/2008 | Wernersson |
| 2009/0219425 A1* | 9/2009 | Kobayashi et al. ........... 348/306 |
| 2009/0251584 A1* | 10/2009 | Alakarhu ................ 348/333.01 |
| 2010/0123821 A1* | 5/2010 | Gwak et al. ................... 348/371 |
| 2011/0122287 A1* | 5/2011 | Kunishige et al. .......... 348/229.1 |
| 2012/0112039 A1* | 5/2012 | Sugano et al. ............. 250/208.1 |
| 2012/0327281 A1* | 12/2012 | Mabuchi ....................... 348/302 |
| 2013/0113886 A1* | 5/2013 | Seo ................................. 348/46 |
| 2013/0135506 A1* | 5/2013 | Kobayashi ..................... 348/311 |
| 2013/0208147 A1* | 8/2013 | Koshiba ......................... 348/239 |

FOREIGN PATENT DOCUMENTS

| | | |
|---|---|---|
| JP | 2005-244760 A | 9/2005 |
| JP | 2006-345317 A | 12/2006 |
| JP | 2007-129545 A | 5/2007 |
| JP | 2007-281547 A | 10/2007 |
| JP | 2007-336314 A | 12/2007 |
| JP | 2008-533781 A | 8/2008 |

* cited by examiner

IMAGING APPARATUS AND IMAGING METHOD

CROSS REFERENCE TO RELATED APPLICATIONS

This application is a Continuation of PCT International Application No. PCT/JP2011/061559, filed on May 19, 2011, which claims priority under 35 U.S.C. §119(a) to Patent Application No. 2010-206107, filed in Japan on Sep. 14, 2010, all of which are hereby expressly incorporated by reference into the present application.

TECHNICAL FIELD

The present invention relates to an imaging apparatus and an imaging method.

BACKGROUND ART

When an astrophotography, etc. are taken, for example, a method is employed in which an image is captured in a long time exposure while a digital camera is fixed to a tripod. Generally, in order to confirm a moving image that is being taken, or a still image and a moving image that have been captured, a display section is installed in the digital camera. However, in the digital camera in the related art, it is not possible to confirm the captured image on the display section in a case of long time exposure imaging, until the imaging is terminated.

For this reason, even in a case where the captured image has become a failure due to an accident in which the tripod is shaken by wind during the imaging, the user does not notice it. That is, the user comes to know for the first time that the captured image has become a fail image, after the imaging is terminated.

Patent Literature 1 discloses an imaging apparatus which captures a plurality of sheets of images in a shorter exposure time than the exposure time to obtain a desirable exposure, and obtains an image of the desirable exposure by synthesizing the plurality of sheets of images.

According to the imaging apparatus, it is possible to obtain an image of the desirable exposure without image vibration. However, since the user can confirm for the first time a synthetic image or one image among the plurality of sheets of image after the imaging of the plurality of sheets of image is terminated, it is not possible to confirm the image in middle of imaging.

Further, the imaging method of Patent Literature 1, a selection is performed according to an image vibration degree as to whether a continuous imaging using a mechanical shutter or a continuous imaging using an electronic shutter. For this reason, in the imaging method of Patent Literature 1, in a case of the continuous imaging using a mechanical shutter, a lot of unexposed periods exist between a plurality of imaging, so the user feels a sense of discontinuity in a synthetic image. Further, in the imaging method of Patent Literature 1, in a case of the continuous imaging using the electronic shutter, a distortion occurs with respect to a moving object. Furthermore, in an imaging method of Patent Literature 1, a process to detect an image vibration is necessary, so the process becomes complicated.

Patent Literature 2 discloses an imaging apparatus which can capture a high quality still image during capturing a moving image. However, in Patent Literature 2, it is not possible to confirm an image during imaging in a long time exposure. Further, in Patent Literature 2, a long time exposure imaging is not considered.

CITATION LIST

Patent Literature

Patent Literature 1 JP-A-2006-345317
Patent Literature 2 JP-A-2005-244760

SUMMARY OF INVENTION

Technical Problem

A first object of the present invention is to provide an imaging apparatus and an imaging method which can simply perform a high quality long time exposure. Further, a second object of the present invention is to provide an imaging apparatus and an imaging method which can confirm in real time an image that is being captured during a long time exposure imaging.

Solution to Problem

An imaging apparatus of the present invention comprises: an imaging element; a display section; an imaging control section which causes the imaging element to perform a plurality of times of imaging; and a display control section which causes an image obtained with a first time of imaging to be displayed on the display section when the first time of imaging is terminated, and causes a synthetic image of an image obtained with each of second and subsequent imaging and an image obtained with all imaging prior to each of second and subsequent imaging among the plurality of times of imaging to be displayed on the display section whenever each of second and subsequent imaging is terminated.

An imaging method of the present invention comprises: an imaging control step which causes an imaging element to perform a plurality of times of imaging; and a display control step which causes an image obtained with a first time of imaging to be displayed on the display section when the first time of imaging is terminated, and causes a synthetic image of an image obtained with each of second and subsequent imaging and an image obtained with all imaging prior to each of second and subsequent imaging among the plurality of times of imaging to be displayed on the display section whenever each of second and subsequent imaging is terminated.

According to the configuration and the method, if a first time of imaging among a plurality of times of imaging is terminated, it is possible to display the image obtained with the imaging on the display section, and if second and subsequent imaging are terminated, it is possible to display the synthetic image of the image obtained with the imaging and the image obtained with all imaging prior to the imaging on the display section.

For this reason, in the middle of a plurality of times of imaging, it is possible for the user of the imaging apparatus to confirm the image obtained at that time on the display section. Therefore, at a time when the image is not obtained as expected, it is possible to stop a plurality of times of imaging to correct the imaging, so there is no waste of time. Further, at a time when the image is obtained as expected, it is possible to terminate the plurality of times of imaging, thereby shortening the time until the termination of the imaging.

An imaging apparatus of the present invention comprises: a MOS type imaging element including a plurality of lines of photoelectric conversion elements; an imaging control section which causes the imaging element to perform a plurality of times of imaging; a synthetic image data generating section which generates synthetic image data by synthesizing a plurality of captured image data that is obtained by processing each of a plurality of captured image signals to be output from the imaging element with the plurality of times of imaging; a recording section which records the synthetic image data in a recording media; and a mechanical shutter provided in a light incident side of the imaging element, in which in a case of a first time of imaging among the plurality of times of imaging, the imaging control section causes an exposure to be simultaneously started in each line, and causes an exposure to be terminated by performing a rolling reading which reads out a signal corresponding to an accumulated charge of the photoelectric conversion element at a shifted timing for each line, in a case of the last imaging among the plurality of times of imaging, the imaging control section causes an exposure to be started by performing a rolling reset which resets the accumulated charge of the photoelectric conversion element at a shifted timing for each line, and causes an exposure to be simultaneously terminated in each line by closing the mechanical shutter, and in a case of the imaging other than the first time of imaging and the last imaging among the plurality of times of imaging, the imaging control section causes an exposure to be started by performing the rolling reset, and causes an exposure to be terminated by performing the rolling reading.

An imaging method of the present invention comprises: an imaging control step which causes a MOS type imaging element including a plurality of lines of a photoelectric conversion element to perform a plurality of times of imaging; a synthetic image data generating step which generates synthetic image data by synthesizing a plurality of captured image data that is obtained by processing each of a plurality of captured image signals to be output from the imaging element with the plurality of times of imaging; and a recording step which records the synthetic image data in a recording media; in which in the imaging control step, in a case of a first time of imaging among the plurality of times of imaging, an exposure is caused to be simultaneously started in each line, and an exposure is caused to be terminated by performing a rolling reading which reads out a signal corresponding to an accumulated charge of the photoelectric conversion element at a shifted timing for each line, in a case of the last imaging among the plurality of times of imaging, an exposure is caused to be started by performing a rolling reset which resets the accumulated charge of the photoelectric conversion element at a shifted timing for each line, and an exposure is caused to be simultaneously terminated in each line by closing the mechanical shutter, and in a case of the imaging other than the first time of imaging and the last imaging among the plurality of times of imaging, an exposure is caused to be started by performing the rolling reset, and an exposure is caused to be terminated by performing the rolling reading.

According to the configuration and the method, exposure starts become equal in all lines in the first imaging, and exposure terminations become equal in all lines in the last imaging. For this reason, the exposure start and the exposure termination in synthetic image data are coincident in all pixels, thereby preventing an image distortion from occurring even in a moving object. Further, it is possible to achieve this effect without a processing to detect an image vibration. Accordingly, it is possible to realize high quality of long time exposure imaging by a simple configuration.

An imaging apparatus of the present invention comprises: an imaging element including a first group having a plurality of photoelectric conversion elements and a second group having a plurality of photoelectric conversion elements; an imaging control section which causes the imaging element to perform a plurality of times of imaging; a synthetic image data generating section which generates synthetic image data by synthesizing a plurality of captured image data that is obtained by processing each of a plurality of captured image signals that is output from the imaging element with the plurality of times of imaging; and a recording section which records the synthetic image data in a recording media, in which the imaging control section causes the first group to perform imaging with respect to an odd number of times of imaging among the plurality of times of imaging, causes the second group to perform imaging with respect to an even number of times of imaging among the plurality of times of imaging, and causes the imaging element to perform the plurality of times of imaging, such that in two consecutive imaging among the plurality of times of imaging, a period necessary for output of a signal obtained by an exposure of former imaging is included in an exposure period of latter imaging.

An imaging method of the present invention comprises: an imaging control step which causes an imaging element including a first group having a plurality of photoelectric conversion elements and a second group having a plurality of photoelectric conversion elements to perform a plurality of times of imaging; a synthetic image data generating step which generates synthetic image data by synthesizing a plurality of captured image data that is obtained by processing each of a plurality of captured image signals to be output from the imaging element with the plurality of times of imaging; and a recording step which records the synthetic image data in a recording media, in which in the imaging control step, the first group is caused to perform imaging with respect to an odd number of times of imaging among the plurality of times of imaging, the second group is caused to perform imaging with respect to an even number of times of imaging among the plurality of times of imaging, and the imaging element is caused to perform the plurality of times of imaging, such that in two consecutive imaging among the plurality of times of imaging, a period necessary for output of a signal obtained by an exposure of former imaging is included in an exposure period of latter imaging.

According to the configuration and the method, without a processing to detect an image vibration, it is possible to remove unexposed period between the plurality of times of imaging. Accordingly, it is possible to realize high quality of long time exposure imaging by a simple configuration.

Advantageous Effects of Invention

According to the present invention, it is possible to provide an imaging apparatus and an imaging method in which the user can confirm in real time an image that is being captured during long time exposure imaging. Further, according to the present invention, it is possible to provide an imaging apparatus and an imaging method in which high quality of long time exposure imaging can be simply performed.

DESCRIPTION OF EMBODIMENTS

Hereinafter, a description of an embodiment of the present invention will be made referring to drawings.

Figure 1:
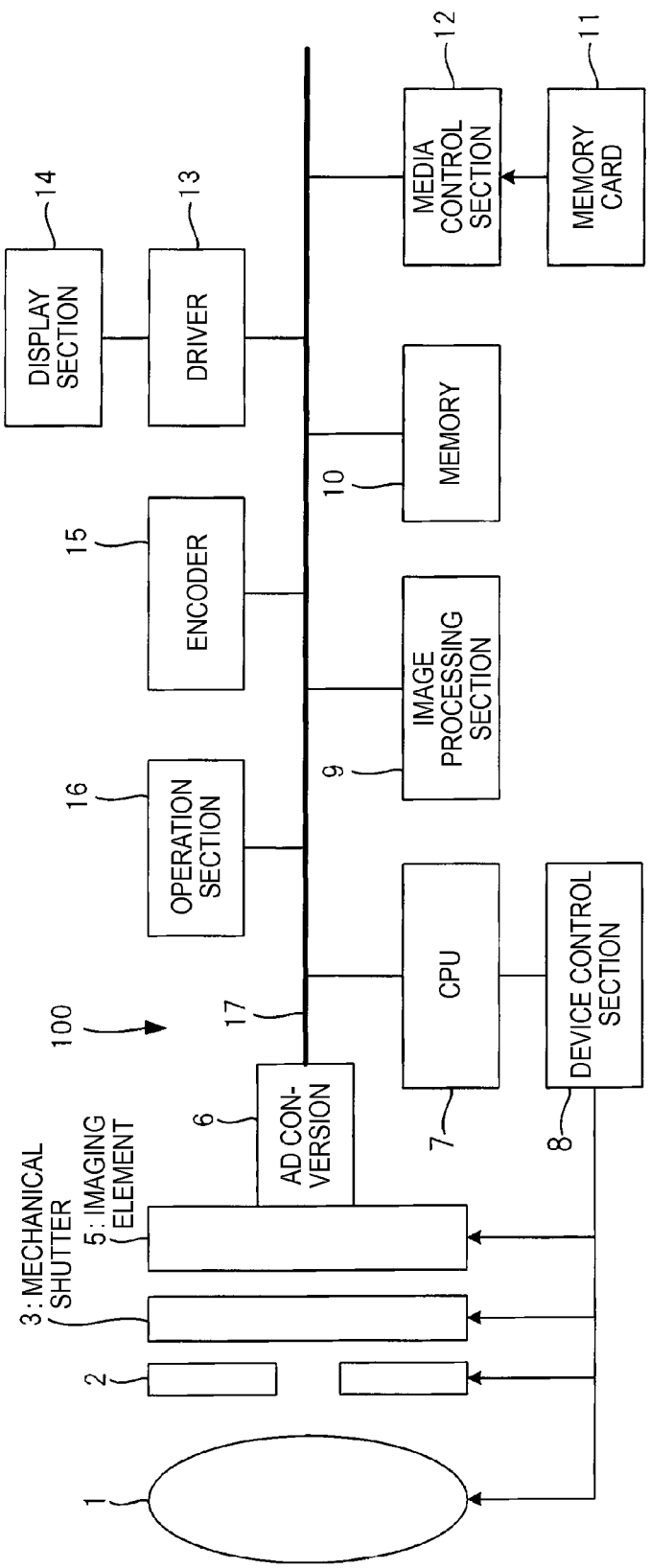
FIG. 1 is a functional block diagram of an imaging apparatus 100 explaining an embodiment of the present invention.

FIG. 1 is a functional block diagram of an imaging apparatus 100 explaining an embodiment of the present invention. The imaging system of the imaging apparatus 100 includes an imaging lens system 1, a diaphragm 2, a mechanical shutter 3, a CMOS (Complementary Metal Oxide Semiconductor) type imaging element 5, and analog/digital (AD) conversion section 6.

The diaphragm 2 is disposed in the rear portion of the imaging lens system 1. The photographing optical system includes the imaging lens system 1 and the diaphragm 2.

The mechanical shutter 3 is disposed in the rear portion of the diaphragm 2. The CMOS type imaging element 5, of which detailed description will be made later, is disposed in the rear portion of the mechanical shutter 3. A captured image signal corresponding to an object optical image, which is passed through the imaging lens system 1 and the diaphragm 2 in this order and incident on the light receiving surface of the imaging element 5, is converted into digital data in an AD conversion section 6, and output to the bus 17.

A central control unit (CPU) 7 which performs overall control of the entire imaging apparatus 100, an operation section 16 which is configured by operation buttons and the like including a shutter release button, an image processing section 9 which is configured by DSP and the like and performs a known image processing with respect to the captured image signal based on the instruction from the CPU 7, an video encoder 15 which converts captured image data, that is obtained by performing an image processing to the captured image signal, into data for display, a driver 13 which displays the captured image data that is converted in the video encoder 15 on the display section 14, a memory 10 which temporarily stores the captured image signal that is output from the imaging element 5, the captured image data that is generated in the image processing section 9, and the like, and a media control section 12 are connected to the bus 17. A recording media (a memory card) 11 is detachably mounted in the media control section 12.

A device control section 8 is connected to the CPU 7. The device control section 8 performs the driving control of the imaging element 5, the opening amount adjustment control of the diaphragm 2, and the opening/closing control of the mechanical shutter 3, according to the instruction from the CPU 7. Further, the device control section 8 performs the focus position control and the zoom position control of the imaging lens system 1, according to the instruction from the CPU 7.

Figure 2:
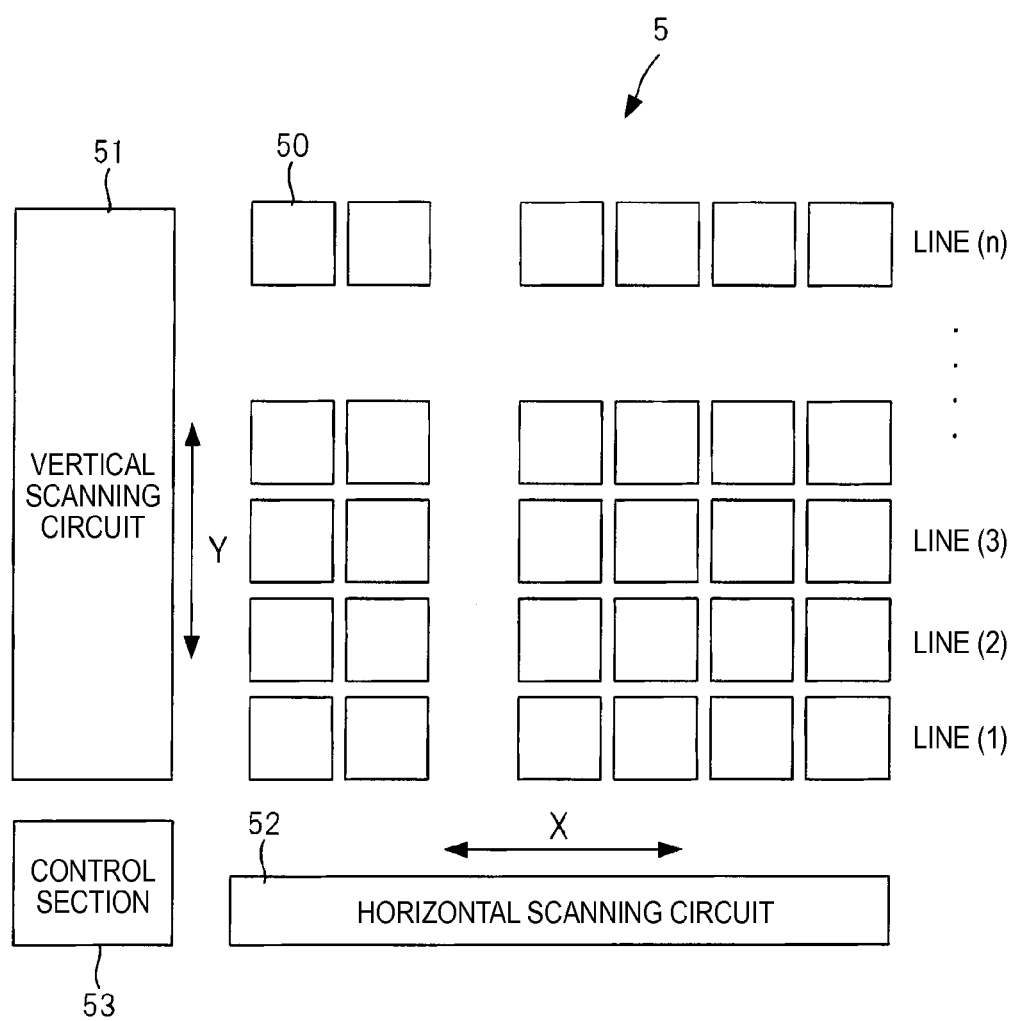
FIG. 2 is a schematic plan view illustrating a schematic configuration of an imaging element 5 in the imaging apparatus 100 shown in FIG. 1.

FIG. 2 is a schematic plan view illustrating a schematic configuration of an imaging element 5 in the imaging apparatus 100 shown in FIG. 1.

The imaging element 5 includes a plurality of photoelectric conversion elements 50 that is arrayed in a two-dimensional shape (a square lattice shape in the example of FIG. 2) in a row direction X and Y direction that is perpendicular to X, a vertical scanning circuit 51, a horizontal scanning circuit 52, and a control section 53.

The plurality of photoelectric conversion elements 50 are disposed such that each line of the photoelectric conversion elements is configured by a plurality of photoelectric conversion elements 50 that are arranged in a row direction X, and n (n is a natural number of two or more) lines are arrayed in a column direction Y. As shown in FIG. 2, it is referred to as line (1), line (2), line (3), . . . , line (n), in order from the bottom in FIG. 2.

In each photoelectric conversion element 50 included in the imaging element 5, a CMOS circuit, not shown, is provided corresponding to the vicinity thereof. The CMOS circuit is, for example, a known three-transistor configuration or a known four-transistor configuration.

The vertical scanning circuit 51 performs a driving which selects each line of the photoelectric conversion element, and reads out a signal to the signal output line from the CMOS circuit corresponding to the selected line. Further, the vertical scanning circuit 51 also performs a driving which controls a reset transistor of the CMOS circuit corresponding to each line to reset the accumulated charges in the photoelectric conversion elements 50 in each line (a driving which discharges the accumulated charges in the photoelectric conversion elements to the drain of the reset transistor of the CMOS circuit).

The horizontal scanning circuit 52 performs a driving which sequentially selects a signal for one line, that is output to the signal output line, to be output to the outside of the imaging element 5.

The control section 53 controls the vertical scanning circuit 51 and the horizontal scanning circuit 52, according to the instruction of the device control section 8.

Next, a description with respect to an action in a case of performing long time exposure imaging in the imaging apparatus 100 configured in this manner will be made. The imaging apparatus 100, in the case of long time exposure imaging, divides the set exposure time into a plurality of times and consecutively performs a plurality of times of short time exposure imaging. Then, the imaging apparatus 100 synthesizes a plurality of images obtained by a plurality of times of short time exposure imaging, so that the imaging apparatus 100 generates the image equivalent to when performing one time of imaging in the set exposure time.

Further, in the middle of imaging during long time exposure imaging, the imaging apparatus 100 displays the image obtained at the time on the display section 14 in real time. Accordingly, it is possible to confirm the image in the middle of imaging. Hereinafter, for example, a description of the action of the imaging apparatus 100 will be made when the imaging apparatus 100 performs fifteen seconds of short time exposure imaging four times and performs long time exposure imaging of which exposure time is 1 minute (for example, imaging that regards a moving object such as a star as a major object).

Figure 3:
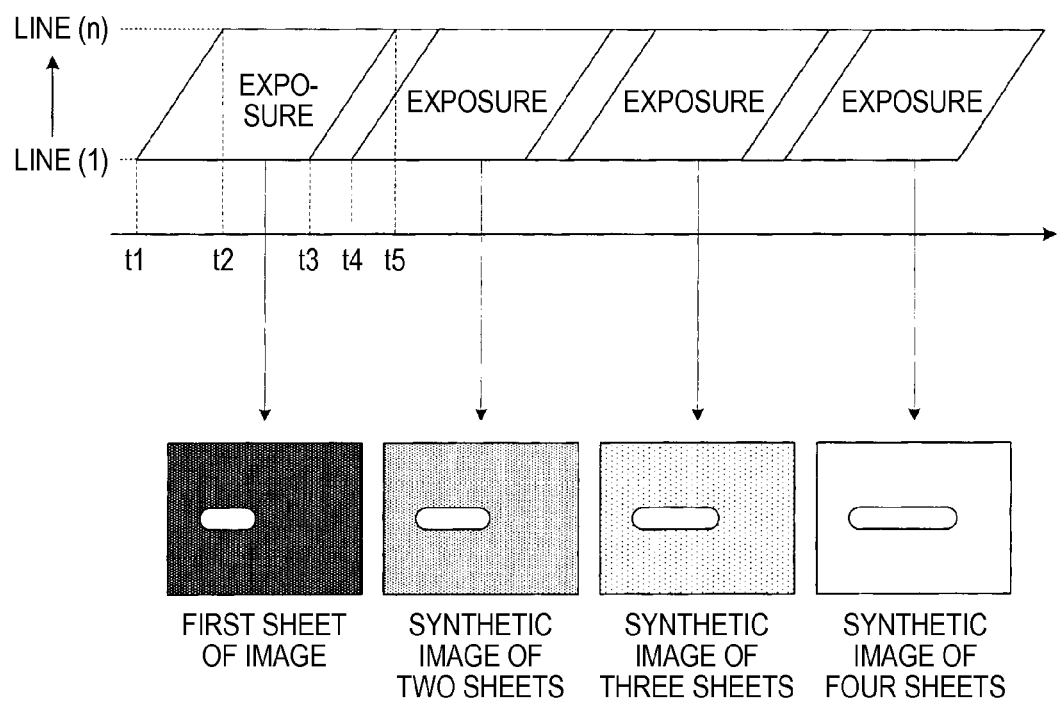
FIG. 3 is a view illustrating a timing chart in a case of a long time exposure imaging operation of the imaging apparatus 100 shown in FIG. 1.

FIG. 3 is a view illustrating a timing chart in a case of the long time exposure imaging of the imaging apparatus 100 shown in FIG. 1. The parallelogram denoted as "exposure" refers to an exposure period of the short time exposure imaging, and the parallelogram between the exposure periods refers to a signal output period.

If there is an imaging instruction, the control section 53 performs a rolling reset which resets each line of the photoelectric conversion element 50 at a shifted timing, in the vertical scanning circuit 51.

In an example of FIG. 3, between from time t1 to time t2, the reset of the photoelectric conversion element 50 is performed in order from line (1) toward line (n). In each line, at a time when the reset of the accumulated charge is terminated, an exposure of a first time of imaging is started.

If it becomes time t3 after a given time elapses from when the exposure of line (1) is started at time t1, the control section 53 performs a rolling reading which reads out a signal according to an accumulated charge of the photoelectric conversion element 50 at a shifted timing for each line of photoelectric conversion element 50 to the signal output line, in the vertical scanning circuit 51.

The signal for one line that is read out to the signal output line, is output to the outside of the imaging element 5 by the horizontal scanning circuit 52. In each line, at a time when the signal according to an accumulated charge of the photoelectric conversion element 50 is read out from the CMOS circuit to the signal output line, the exposure of the first time of imaging is terminated. Further, in each line, at a time when the signal for one line that is read out to the signal output line, is output to the outside of the imaging element 5 by the horizontal scanning circuit 52, the exposure of the first time of imaging is terminated.

In the example of FIG. 3, between from time t3 to time t5, the signal according to an accumulated charge of the photoelectric conversion element 50 is read out to the signal output line in order from line (1) toward line (n). The signal for one line that is output to the signal output line, is output to the imaging element 5 in the order of output.

If the signal that is read out from the line (n) to the output signal line at time t5, is output to the outside of the imaging element 5 (if the first time of imaging is terminated in the entire line), the image processing section 9 performs an image processing to the captured image signal obtained by the first time of imaging that is stored in the memory 10, generates the captured image data (1) and stores the captured image data (1) in the memory 10.

If the captured image data (1) is generated, the encoder 15 converts the captured image data into data for display. Then, driver 13 displays an image based on the data for display (the first sheet of image shown in FIG. 3) on the display section 14.

With respect to the line in which the exposure is terminated by the rolling reading started at time t3, at a time when the output of the signal to the outside of the imaging element 5 in the line is terminated, the control section 53 resets the accumulated charge of the photoelectric conversion element in the line in the vertical scanning circuit 51, and causes the exposure of the second time of imaging of the line to be started. In short, the control section 53 causes the exposure of the second time of imaging in each line to be sequentially started by the rolling reset.

If it becomes the time when a given time elapses from time t4 when the exposure of the photoelectric conversion element of line (1) is started by rolling reset, the control section 53 starts the rolling reading, and causes the exposure of the second time of imaging to be sequentially terminated in each line.

After the rolling reading is terminated, if the signal that is read out from the line (n) to the signal output line is output to the outside of the imaging element 5 (if the second time of imaging is terminated in entire lines), the image processing section 9 performs an image processing to the captured image signal obtained by the second time of imaging that is stored in the memory 10, generates the captured image data (2) and stores the captured image data (2) in the memory 10.

Subsequently, the image processing section 9 synthesizes the captured image data (1) that is generated with the first time of imaging and the captured image data (2) that is generated with the second time of imaging to generate the synthetic image data (1), and stores the synthetic image data (1) in the memory 10.

If the synthetic image data (1) is generated, the encoder 15 converts the synthetic image data (1) into data for display. Then, the driver 13 displays the synthetic image based on the data for display on the display section 14 (a synthetic image of two sheets of the captured image data shown in FIG. 3 (it is simply shown as two sheets of synthetic images in the drawing)).

The control section 53 performs a rolling reset after the termination of the second time of imaging, and causes the exposure of the exposure of the third time of imaging to be sequentially started in each line. After that, the control section 53 performs the rolling reading, and causes the exposure of the third time of imaging to be sequentially terminated in each line.

After the rolling reading is terminated, if the signal that is read out from the line (n) to the signal output line is output to the outside of the imaging element 5 (if the third time of imaging is terminated in entire lines), the image processing section 9 performs an image processing to the captured image signal obtained by the third time of imaging that is stored in the memory 10, generates the captured image data (3) and stores the captured image data (3) in the memory 10.

Subsequently, the image processing section 9 generates the synthesized image data (2) in which the synthesized image data (1) and the captured image data (3) are synthesized, and stores the synthetic image data (2) in the memory 10.

If the synthetic image data (2) is generated, the encoder 15 converts the synthetic image data (2) into data for display. Then, the driver 13 displays the synthetic image based on the data for display on the display section 14 (a synthetic image of three sheets of the captured image data shown in FIG. 3 (it is simply shown as three sheets of synthetic images in the drawing)). In addition, the synthetic image data (2) may be generated by synthesizing the captured image data (1) to (3).

After the third time of imaging is terminated, the control section 53 performs the rolling reset and causes the exposure of the fourth time of imaging to be sequentially started in each line. After that, the control section 53 performs the rolling reading and causes the exposure of the fourth time of imaging to be sequentially terminated in each line.

After the rolling reading is terminated, if the signal that is read out from the line (n) to the signal output line is output to the outside of the imaging element 5 (if the fourth time of imaging is terminated in entire lines), the image processing section 9 performs an image processing to the captured image signal obtained by the fourth time of imaging that is stored in the memory 10, generates the captured image data (4) and stores the captured image data (4) in the memory 10.

Subsequently, the image processing section 9 generates the synthesized image data (3) in which the synthesized image data (2) and the captured image data (4) are synthesized, and stores the synthetic image data (3) in the memory 10.

If the synthetic image data (3) is generated, the encoder 15 converts the synthetic image data (3) into data for display. Then, the driver 13 displays the synthetic image based on the data for display on the display section 14 (a synthetic image of four sheets of the captured image data shown in FIG. 3 (it is simply shown as four sheets of synthetic images in the drawing)). In addition, the synthetic image data (3) may be generated by synthesizing the captured image data (1) to (4).

After the synthetic image data (3) is generated, the image processing section 9 records the synthetic image data (3) in the memory card 11 through a media control section 12. If the synthetic image data (3) is recorded in the memory card 11, the long time exposure imaging is terminated.

In this manner, in a case of the long time exposure imaging, if the first time of imaging of a plurality of times of imaging that is continuously performed, is terminated, the imaging apparatus 100 displays the image obtained by the imaging on the display section 14. Further, if the second and subsequent imaging are terminated, the imaging apparatus 100 displays the synthetic image of the image obtained with the imaging and the image obtained with all imaging prior to the imaging on the display section 14.

For this reason, in the middle of a plurality of times of imaging during long time exposure imaging, it is possible for the user of the imaging apparatus 100 to confirm the image obtained in a case where the imaging is terminated at the time, on the display section 14. Therefore, at a time when the image is not obtained as expected, it is possible to stop a long time exposure imaging and newly restart the long time exposure imaging, so there is no waste of time. Further, at a time when the image is obtained as expected, it is possible to terminate the long time exposure imaging, thereby shortening the time until the termination of the imaging.

Further, the imaging apparatus 100 divides the long time exposure into a plurality of times of exposure and performs the exposure. For this reason, compare to a case of performing the long time exposure imaging in one time exposure it is easy to ensure a saturation capacity in each short time exposure imaging and it is possible to loosen the constraint condition such as an aperture value. Further, since each short time exposure imaging is a short exposure, it is possible to reduce the noise by that amount.

In addition, in a driving example of FIG. 3, the exposure start of entire imaging is regarded as performing a rolling reset and the exposure termination of entire imaging is regarded as performing a rolling reading. However, with consideration of an object to confirm the image in the middle of imaging, a driving method of a plurality of times of imaging is not limited to the driving method shown in FIG. 3.

Figure 4:
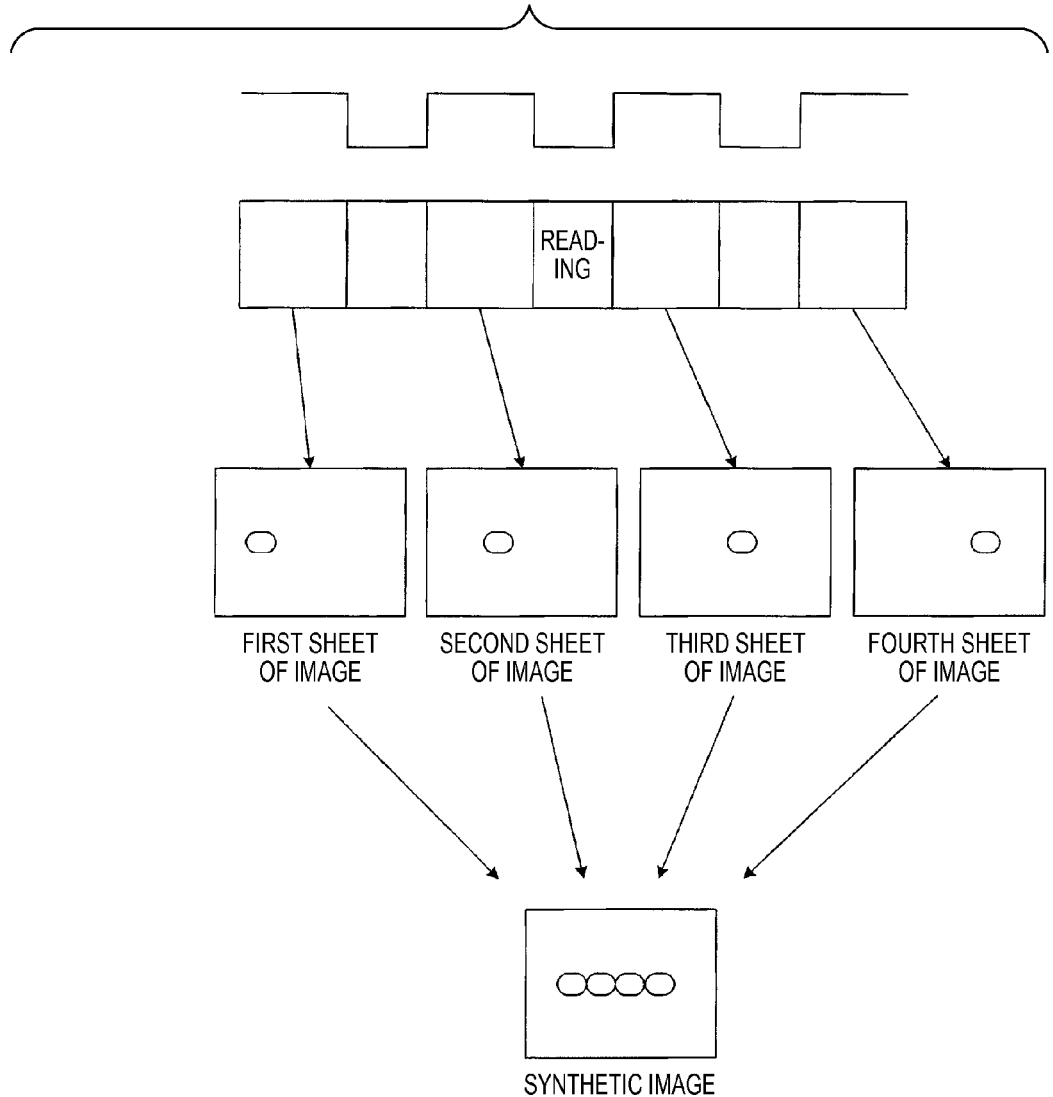
FIG. 4 is a view illustrating a modification example of a plurality of times of imaging method in a case of the long time exposure imaging operation of the imaging apparatus 100 shown in FIG. 1.

For example, as shown in FIG. 4, a driving method may be employed in which the mechanical shutter 3 is opened by the exposure period of each of four times of imaging and the exposure start and the exposure termination in each imaging are equal in entire lines.

In a driving example shown in FIG. 4, the device control section 8 opens the mechanical shutter 3 to cause the exposure of the first time of imaging to be started and closes the mechanical shutter 3 to cause the exposure to be terminated. After the exposure termination, the device control section 8 performs the rolling reading to read the signal. If the output of the signal of the line (n) to the outside of the imaging element is terminated, the device control section 8 performs a global reset which simultaneously resets the accumulated charge of the photoelectric conversion element 50 of the entire lines, and opens the mechanical shutter 3 to cause the exposure of the next imaging to be started. The device control section 8 repeats this driving.

In a case of employing a driving in FIG. 4, a signal output period after the termination of each exposure becomes longer than the driving shown in FIG. 3. The signal output period is a period in which the exposure is not performed. For this reason, if the signal output period becomes long, as shown in FIG. 4, in the synthetic image obtained in a case where the images of four sheets are synthesized, the main object is synthesized in a non-continuous form. In a case of the driving shown in FIG. 3, it is possible to make the signal output period very small, thereby achieving a high quality of synthetic image.

Further, a driving may be employed in which the imaging element 5 is a CCD (Charge Coupled Device) type, and using an electronic shutter or a mechanical shutter 3, a plurality of times of imaging is consecutively performed. Also in this case, since the signal output period in the driving of FIG. 4 becomes longer than the signal output period in the diving of FIG. 3, it is preferable to employ the driving shown in FIG. 3 in order to achieve a high quality of synthetic image.

In addition, in the above description, it was assumed that at a time when the last imaging is terminated among the four times of imaging, the synthetic image data (3) is recorded in the memory card 11. However, for example, it may have a configuration such that in a case where there is an instruction to terminate an imaging in the middle of four times of imaging, when the instruction is made, the latest synthetic image data (in a case where only the first time of imaging is terminated, the captured image data (1)) stored in the memory 10 is recorded in the memory card 11.

Through this configuration, it is possible for the user to terminate the imaging at a time when the desired image is displayed on the display section 14, and record the synthetic image data corresponding to the image while the user confirms the display section 14.

Further, the imaging apparatus 100 may record in the memory card 11 not only the synthetic image data but also entire captured image data that is generated at a time when there is an instruction to terminate an imaging or a plurality of times of imaging that is supposed is completely terminated. Since the entire captured image data is recorded, it is possible for the user to freely generate a favorite synthetic image data after imaging.

Further, it may be controlled in the imaging apparatus 100 that among a plurality of times of imaging that is supposed in a case of the long time exposure imaging, the exposure start of the first time of imaging may be simultaneously controlled in all lines and the exposure termination of the last imaging may be simultaneously controlled in all lines.

Figure 5:
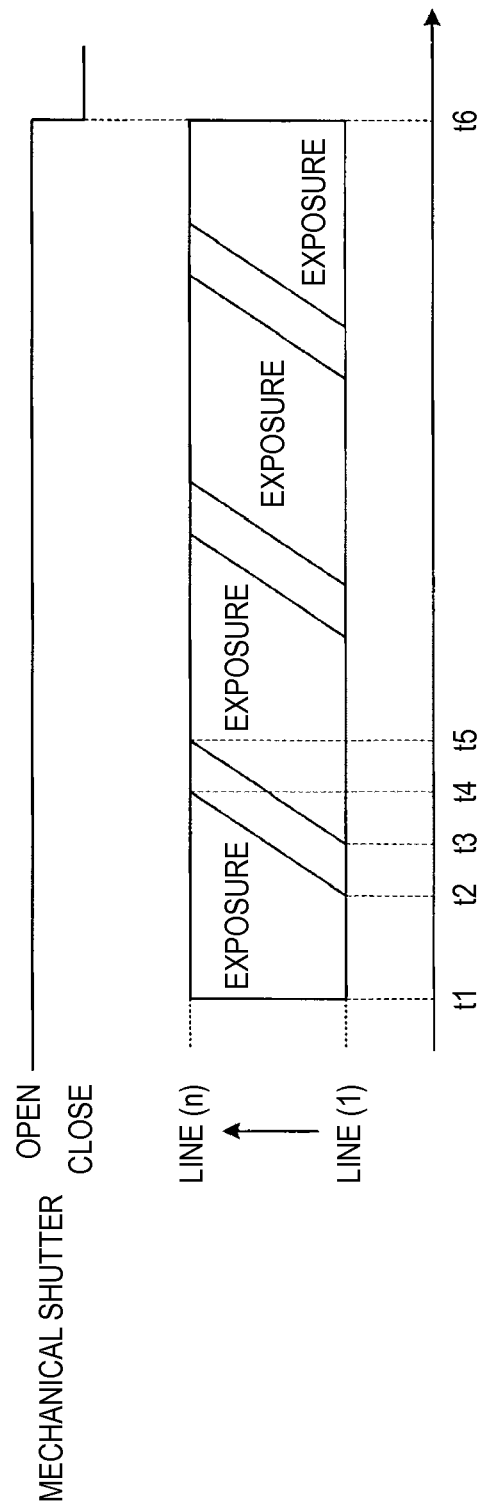
FIG. 5 is a timing chart illustrating a modification example of an operation in a case of the long time exposure imaging of the imaging apparatus 100 shown in FIG. 1.

FIG. 5 is a timing chart illustrating a modification example of an operation in a case of the long time exposure imaging of the imaging apparatus 100 shown in FIG. 1. Time t1 to t4 in FIG. 5 are the same as time t2 to t5 in FIG. 4. FIG. 5 is different from FIG. 3 in that when an imaging instruction is made, the control section 53 causes the vertical scanning circuit 51 to perform a global reset which simultaneously resets the accumulated charge of the entire lines and causes the exposure of the first time of imaging to be simultaneously started in all lines. In addition, FIG. 5 is different from FIG. 3 in that the device control section 8 performs four time of image through the control section 53 in a state where the mechanical shutter 3 opens and terminates simultaneously the exposure of the fourth time of imaging in all lines by the driving for closing the mechanical shutter.

As shown in FIG. 5, the control section 53 performs the global reset in time t1 to cause the exposure of the first time of imaging to be started simultaneously in all lines. After that, the control section 53 causes the second to fourth time of imaging to be performed by the rolling reading and the rolling reset.

Then, if it becomes time t6 after a given time elapses from when the exposure of the fourth time of imaging is started, the device control section 8 closes the mechanical shutter 3 to perform a driving to causes the exposure in the all lines to be simultaneously terminated. In time t6 and subsequent time, the control section 53 performs the rolling reading to cause the fourth time of imaging to be terminated.

By performing the driving shown in FIG. 5, it is possible to cause the exposure start timing of the first time of imaging and the exposure termination timing of the fourth time of imaging to be matched in all lines. For this reason, in a case where the object is moving at high speed during the time when the fourth imaging is performed, the distortion does not occur in the synthetic image of the image obtained with the finally generated four imaging. Accordingly, it is possible to improve the image quality in a case of the long time exposure imaging.

In addition, in the driving shown in FIG. 5, the exposure start of the first time of imaging may be controlled by the mechanical shutter 3. In this case, at a time when the imaging instruction is made, the device control section 8 may open the mechanical shutter 3 to cause the exposure to be started simultaneously in all lines.

Figure 6:
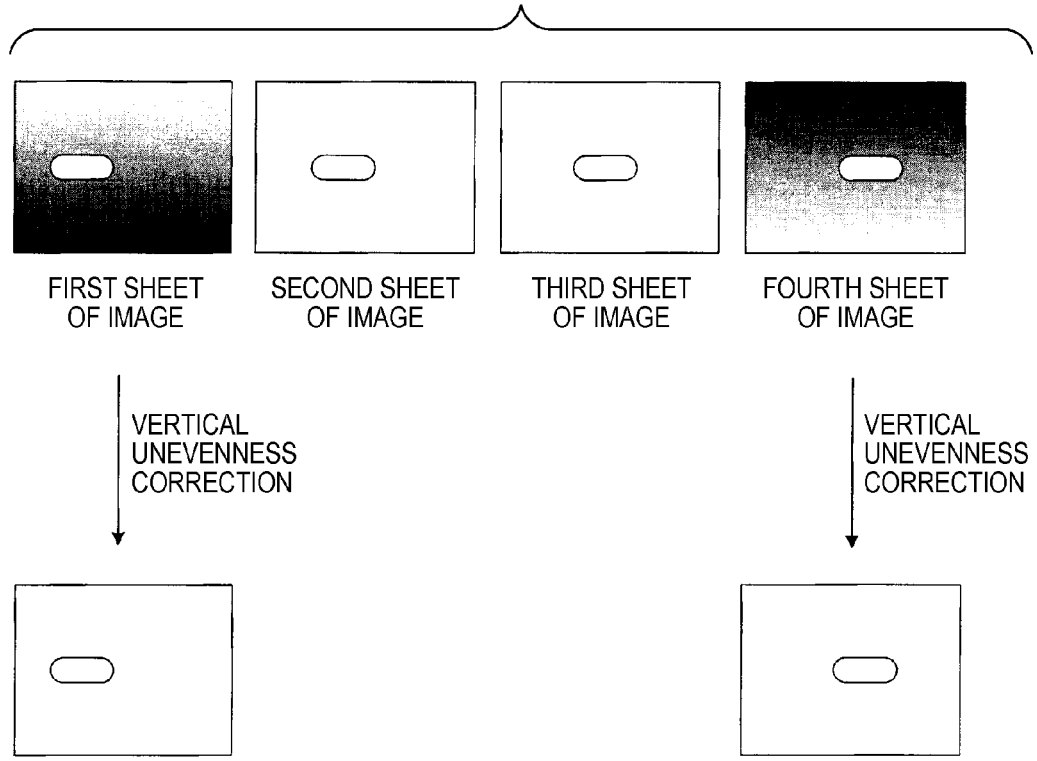
FIG. 6 is a view illustrating a process to correct unevenness in brightness of an image.

In addition, in a case of employing the driving shown in FIG. 5, in the first time of imaging and the fourth time of imaging, the exposure time does not made equal in all the signal output lines. For this reason, as shown in FIG. 6, among the images obtained with the first to fourth imaging, unevenness in brightness (vertical unevenness) occurs toward the column direction Y in the first sheet of imaging obtained with the first time of imaging and the fourth sheet of imaging obtained with the fourth time of imaging.

Accordingly, it is preferable that with regard to the captured image data (1) generated after the termination of the first time of imaging and the captured image data (4) generated after the termination of the fourth time of imaging, the image processing section 9 performs a processing to correct the unevenness in brightness after the data is generated to store the corrected data in the memory 10.

The processing to correct the unevenness in brightness adjusts the brightness of the other lines to the brightness of the brightest line (n) in a case of the captured image data (1), and adjusts the brightness of the other lines to the brightness of the brightest line (1) in a case of the captured image data (4). Through this processing, it is possible to make the image or the synthetic image displayed on the display section 14 good during the imaging.

Further, even in a case of adopting any driving of FIG. 3, FIG. 4 (including a case of being adapted to a CCD type), and FIG. 5, in the image displayed on the display section 14, the first sheet of image is darkest, next, it becomes brighter in order from the synthetic image of the captured image data of two sheets to the synthetic image of the captured image data of three sheets, and the synthetic image of the captured image data of four sheets is brightest.

Therefore, when the data for display is generated, it is preferable that the encoder 15 performs a gain-up processing with respect to the original image such that the brightness of all data for display is identical to the brightness of data for display that is converted from the synthetic image data (3).

Specifically, if the number of the short time exposure imaging to be performed in a case of the long time exposure imaging is K and the number of the short time exposure imaging that has been finished in a case when any data for display is generated is L, the encoder 15 performs a processing to make the generated data for display (K/L) times.

Figure 7:
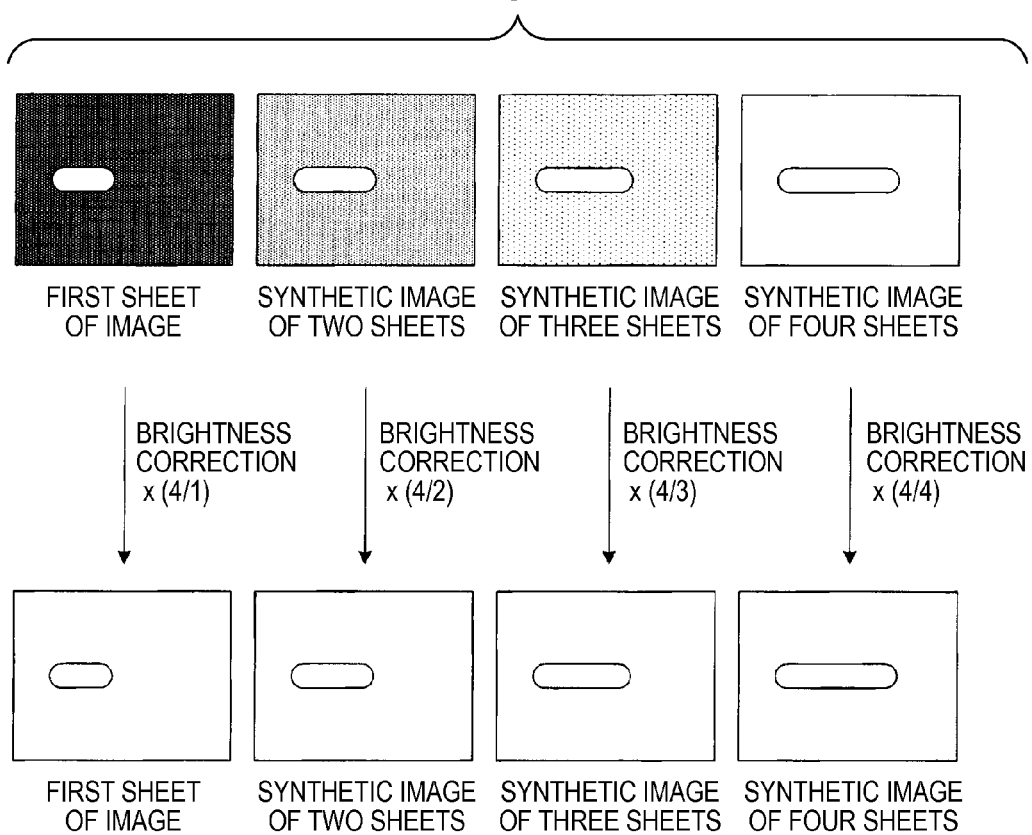
FIG. 7 is a view illustrating a brightness correction process of an image.

For example, in a case where K=4, as shown in FIG. 7, the encoder 15 performs a gain-up processing of making four times to the data for display (the original image) obtained by converting the captured image data (1). Further, the encoder 15 performs a gain-up processing of making twice to the data for display (the original image) obtained by converting the synthetic image data (1). Furthermore, the encoder 15 performs a gain-up processing of making three-fourths times to the data for display (the original image) obtained by converting the synthetic image data (2). Furthermore, the encoder 15 does not perform a gain-up processing or perform a gain-up processing of making one time to the data for display (the original image) obtained by converting the synthetic image data (3).

Through this processing, it is possible to confirm the finally obtained synthetic image and the image during the driving in the same brightness, thereby displaying the image in the conspicuous manner. The above processing and the processing to correct the unevenness in brightness may be combined to be performed.

Further, even in a case of adopting any driving of FIG. 3, FIG. 4 (including a case of being adapted to a CCD type), and FIG. 5, the number of the short time exposure imaging that is set when long time exposure imaging is performed may be set manually by the user or automatically by the imaging apparatus 100.

For example, in a case where the set aperture value is equal to or less than the threshold value, the light receiving amount of the imaging element 5 becomes big. For this reason, the imaging apparatus 100 performs a processing to shorten the time of the short time exposure to increase the number of the short time exposure imaging, in order for each photoelectric conversion element 50 of the imaging element 5 not to be saturated. Further, in a case where the set aperture value exceeds the threshold value, the light receiving amount of the imaging element 5 becomes small. For this reason, the imaging apparatus 100 performs a processing to lengthen the time of the short time exposure to reduce the number of the short time exposure imaging.

Hereinafter, a description of a modification example of the imaging apparatus 100 will be made.

Figure 8:
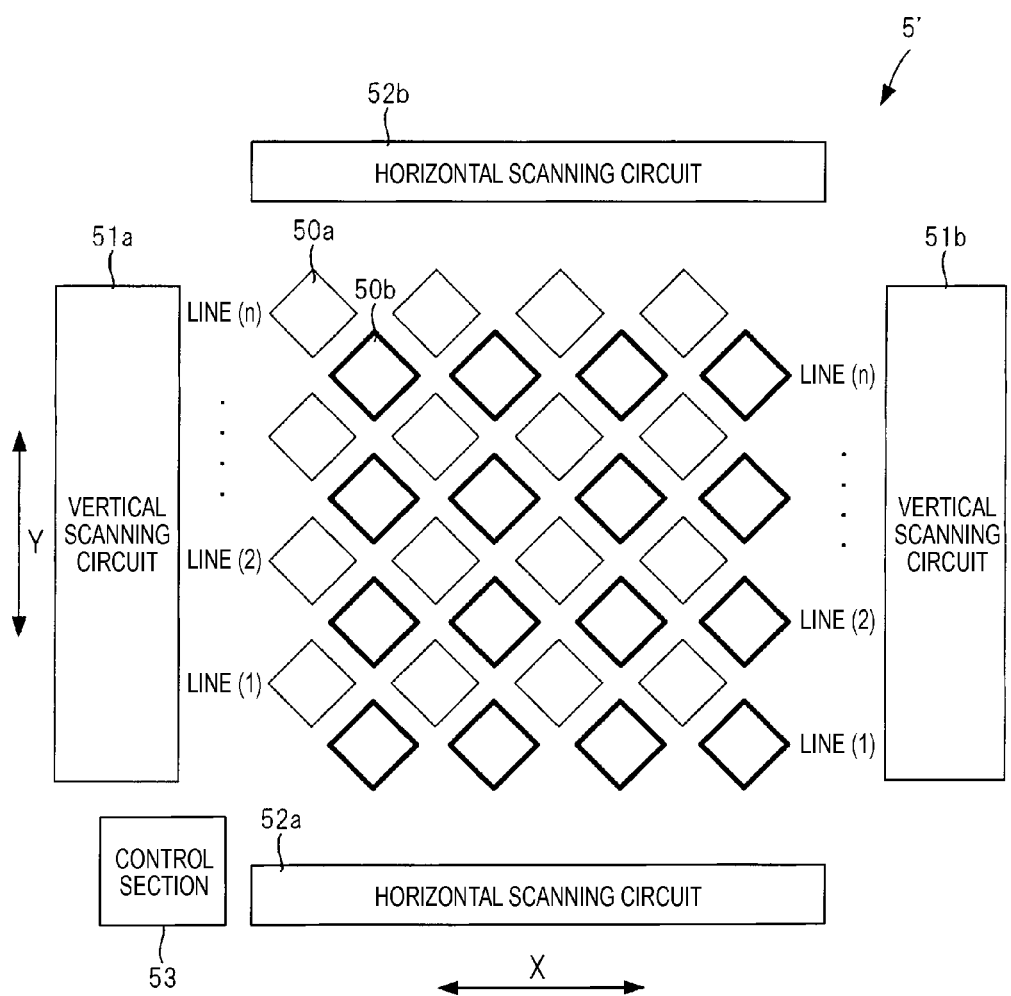
FIG. 8 is a schematic plan view illustrating a modification example of the imaging element 5 installed in the imaging apparatus 100 shown in FIG. 1.

FIG. 8 is a schematic plan view illustrating a modification example of the imaging element 5 installed in the imaging apparatus 100 shown in FIG. 1. The configuration of the imaging apparatus is the same as FIG. 1 except for that the imaging element 5 is changed to the imaging element 5' shown in FIG. 8.

As shown in FIG. 8, the imaging element 5' includes a first group having a plurality of photoelectric conversion elements 50a, a second group having a plurality of photoelectric conversion elements 50b, a vertical scanning circuit 51a and a horizontal scanning circuit 52a that are provided corresponding to the first group and a vertical scanning circuit 51b and a horizontal scanning circuit 52b that are provided corresponding to the second group.

The entire photoelectric conversion elements included in the imaging element 5' are disposed in a two-dimensional shape arranged in a column direction Y of a semiconductor substrate surface and in a row direction X perpendicular thereto. With regard to the entire photoelectric conversion elements, first lines configured by a plurality of photoelectric conversion elements 50a arranged in the row direction X and second lines configured by a plurality of photoelectric conversion elements 50b arranged in the row direction X are alternately arranged with a certain pitch in the row direction Y. Further, the first line is shifted and disposed relative to the second line in the row direction X by a half of the arrangement pitch in the row direction X for the photoelectric conversion elements of each line.

It is possible to obtain the above arrangement by disposing the photoelectric conversion element 50b in the position shifted in the direction of 45° inclination relative to each photoelectric conversion element 50a that is disposed in a square lattice shape.

As shown in FIG. 8, the first line and the second line are respectively referred to as line (1), line (2), line (3), . . . , line (n), in order from the bottom in FIG. 8.

The entire photoelectric conversion elements included in the imaging element 5' have approximately the same configuration (same values on the design). The approximately the same configuration means that the sizes of the photoelectric conversion regions (photodiodes) formed within the semiconductor substrates are approximately the same and the sizes of openings of the light shielding films formed above the photoelectric conversion regions are approximately the same.

In the entire photoelectric conversion elements included in the imaging element 5', a CMOS circuit, not shown, is provided corresponding to the vicinity thereof. The CMOS circuit is, for example, a known three-transistor configuration or a known four-transistor configuration.

The vertical scanning circuit 51a performs a rolling reading which selects each one line of the first group from line (1) toward line (n), and reads out a signal to the signal output line from the CMOS circuit corresponding to the selected line. Further, the vertical scanning circuit 51a also performs a rolling reset which resets the accumulated charges in the photoelectric conversion elements 50a of the first group in order from line (1) toward line (n) at a shifted timing.

The horizontal scanning circuit 52a performs a driving which sequentially selects a signal for one line of the first group, that is output to the signal output line, to be output to the outside of the imaging element 5'.

The vertical scanning circuit 51b performs a rolling reading which selects each one line of the second group from line (1) toward line (n), and reads out a signal to the signal output line from the CMOS circuit corresponding to the selected line. Further, the vertical scanning circuit 51b also performs a rolling reset which resets the accumulated charges in the photoelectric conversion elements 50b of the second group in order from line (1) toward line (n) at a shifted timing.

The horizontal scanning circuit 52b performs a driving which sequentially selects a signal for one line of the second group, that is output to the signal output line, to be output to the outside of the imaging element 5'.

The control section 53 controls the vertical scanning circuit 51a, 51b and the horizontal scanning circuit 52a, 52b according to the instruction of the device control section 8.

Next, a description with respect to an action in the case of performing long time exposure imaging in the imaging apparatus 100 in which the imaging element 5' is installed, will be made. Hereinafter, a description with respect to an action in the case of performing long time exposure imaging by performing eight short time exposure imaging will be made.

Figure 9:
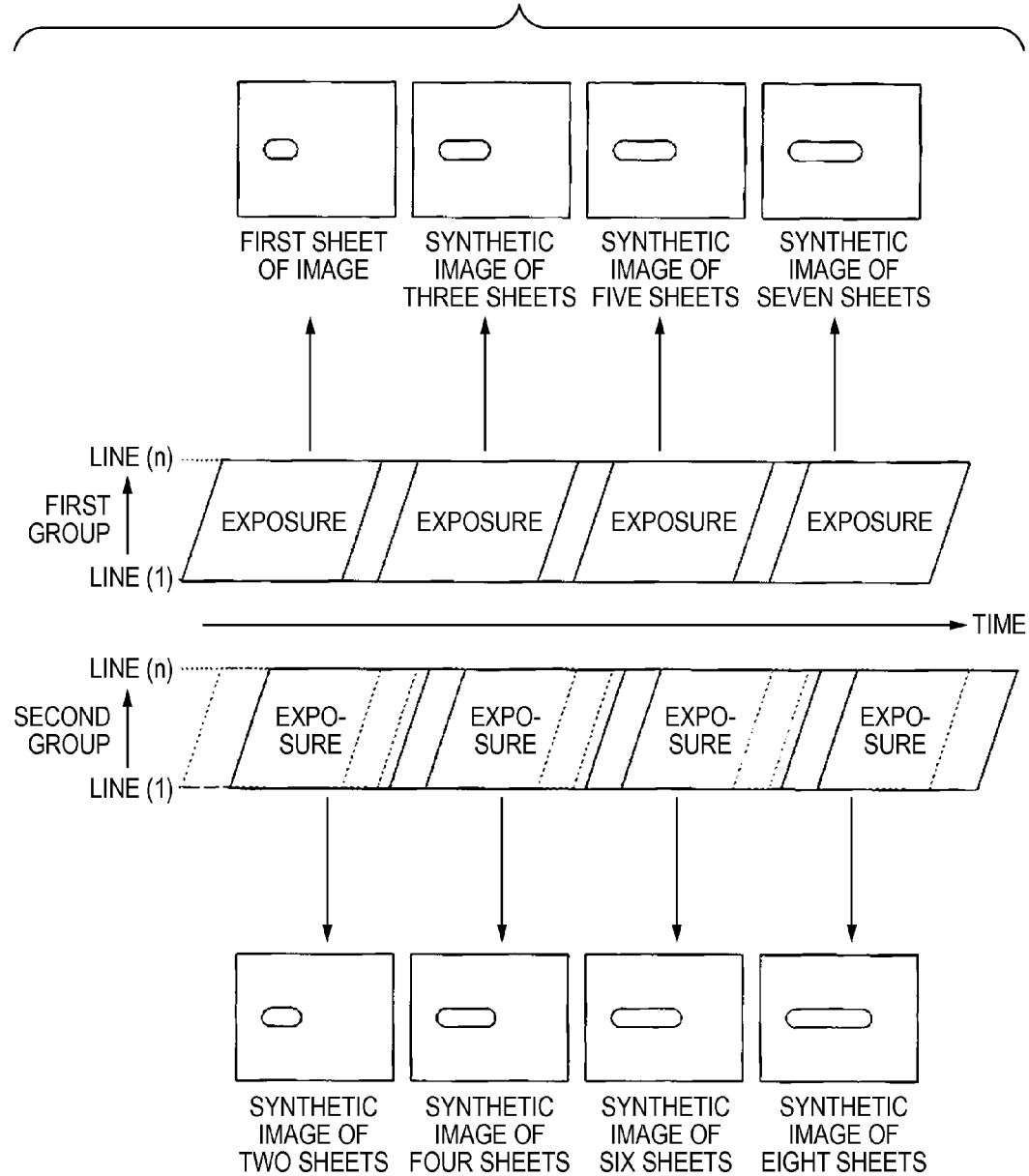
FIG. 9 is a view illustrating a timing chart in a case of the long time exposure imaging operation of the imaging apparatus 100 in which the imaging element 5' shown in FIG. 8 is installed.

FIG. 9 is a view illustrating a timing chart in a case of the long time exposure imaging of the imaging apparatus 100 in which the imaging element 5' shown in FIG. 8 is installed. The parallelogram denoted as "exposure" refers to an exposure period in a case of the short time exposure imaging, and the parallelogram between the exposure periods refers to a signal output period. In addition, the exposure period of the short time exposure each has the same length.

If there is an imaging instruction, the control section 53 performs a rolling reset in the vertical scanning circuit 51a to reset the accumulated charge of the photoelectric conversion element 50a of the first group at a shifted timing for each line. In each line of the first group, at a time when the reset of the accumulated charge is terminated, the exposure is started (the start of the first time of short time exposure imaging).

If a given time (one third of the exposure time of the first time of short time exposure imaging in an example of FIG. 9) elapses after the exposure is started in the line (1) of the first group, the control section 53 performs the rolling reset in the vertical scanning circuit 51b to reset the accumulated charge of the photoelectric conversion element 50a of the second group at a shifted timing for each line. In each line of the second group, at a time when the reset of the accumulated charge is terminated, the exposure is started (the start of the second time of short time exposure imaging).

If a given time (two thirds of the exposure time of the first time of short time exposure imaging in an example of FIG. 9) elapses after the exposure is started in the line (1) of the second group, the control section 53 performs the rolling reading in the vertical scanning circuit 51a and reads out a signal according to an accumulated charge of the photoelectric conversion element 50a of the first group to the signal output line at a shifted timing for each line. The signal for one line read in the signal output line is output to the outside of the imaging element 5' by the horizontal scanning circuit 52a.

In each line of the first group, at a time when the reading of the signal according to an accumulated charge of the photoelectric conversion element 50a from the CMOS circuit to the signal output line is terminated, the exposure is terminated. Further, in each line, at a time when all of the signal for one line that is read out to the signal output line, is output to the outside of the imaging element 5' by the horizontal scanning circuit 52a, the first time of short time exposure imaging is terminated.

If the signals of all lines of the first group are output to the outside of the imaging element 5' (if the first time of short time exposure imaging is terminated), the image processing section 9 performs an image processing to the captured image signal obtained by the first time of short time exposure imaging that is stored in the memory 10, generates the captured image data (1) and stores the captured image data (1) in the memory 10.

If the captured image data (1) is generated, the encoder 15 converts the captured image data into data for display. Then, driver 13 causes an image based on the data for display (the first sheet of image shown in FIG. 9) to be displayed on the display section 14.

After the imaging of the line (1) of the first group is terminated, the control section 53 performs a rolling reset in the vertical scanning circuit 51a to cause the next exposure to be sequentially started in each line, in the first group (the start of the third time of short time exposure imaging).

If it becomes the exposure termination timing of the line (1) of the second group, the control section 53 performs a rolling reading in the vertical scanning circuit 51b to read out a signal according to an accumulated charge of the photoelectric conversion element 50b of the second group to the signal output line at a shifted timing for each line.

In each line of the second group, at a time when the reading of the signal according to an accumulated charge of the photoelectric conversion element 50b from the CMOS circuit to the signal output line is terminated, the exposure is terminated. Further, in each line, at a time when all of the signal for one line that is read out to the signal output line, is output to the outside of the imaging element 5' by the horizontal scanning circuit 52b, the second time of short time exposure imaging is terminated.

If the signals from all lines of the second group are output to the outside of the imaging element 5 (if the second time of short time exposure imaging is terminated), the image processing section 9 performs an image processing to the captured image signal obtained by the second time of short time exposure imaging that is stored in the memory 10, generates the captured image data (2) and stores the captured image data (2) in the memory 10.

Subsequently, the image processing section 9 synthesizes the captured image data (1) that is generated with the first time of short time exposure imaging and the captured image data (2) that is generated with the second time of short time exposure imaging to generate the synthetic image data (1), and stores the synthetic image data (1) in the memory 10.

If the synthetic image data (1) is generated, the encoder 15 converts the synthetic image data (1) into data for display. Then, the driver 13 causes the synthetic image based on the data for display to be displayed on the display section 14 (a synthetic image of two sheets of captured image data shown in FIG. 9 (it is simply shown as two sheets of synthetic images in the drawing)).

After the imaging of the line (1) of the second group is terminated (after the second time of short time exposure imaging is terminated), the control section 53 performs the rolling reset in the vertical scanning circuit 51b, and causes the next exposure to be sequentially started in each line, in the second group (the start of the fourth time of short time exposure imaging).

Hereinafter, in a similar flow, the following is sequentially performed: the rolling reading of the first group, the display of the synthetic image of the captured image data of three sheets, the rolling reset of the first group (the start of the fifth time of short time exposure imaging), the rolling reading of the second group, the display of the synthetic image of the captured image data of four sheets, the rolling reset of the second group (the start of the sixth time of short time exposure imaging), the rolling reading of the first group, the display of the synthetic image of the captured image data of five sheets, the rolling reset of the first group (the start of the seventh time of short time exposure imaging), the rolling reading of the second group, the display of the synthetic image of the captured image data of six sheets, the rolling reset of the second group (the start of the eighth time of short time exposure imaging), the rolling reading of the first group, the display of the synthetic image of the captured image data of seven sheets, the rolling reading of the second group, and the display of the synthetic image of the captured image data of eight sheets. Then, the synthetic image of the captured image data of eight sheets obtained with the eight times of short time exposure imaging is recorded in the memory card 11, thus the long time exposure imaging is terminated.

In this manner, the imaging device of the modification example performs imaging using the first group with respect to the short time exposure imaging to be performed in an odd number of times and performs imaging using the second group with respect to the short time exposure imaging to be performed in an even number of times. Further, the imaging device shifts the start timings of the short time exposure in the imaging performed in the first group and the imaging performed in the second group, among a plurality of times of short time exposure imaging that is continuously performed in a case of the long time exposure imaging.

In the timing chart of the second group shown in FIG. 9, the timing chart of the first group is indicated by the dashed line. In order to see and know the dashed line and the timing chart of the second group, the entire of the unexposed period (the signal output period) that occurs between short time exposure periods performed in the first group is included in each short time exposure period that is performed in the second group. In addition, the entire of the unexposed period (the signal output period) that occurs between short time exposure periods performed in the second group is included in each short time exposure period that is performed in the first group. For this reason, it is possible to eliminate the unexposed period that occur in a case of by dividing the long time exposure imaging into a plurality of times of the short time exposure imaging and performing the short time exposure imaging.

In order to eliminate the unexposed period, among two continuous short time exposure imaging, a plurality of times of short time exposure imaging may be performed such that the signal output period after the exposure termination of the former short time exposure imaging is included in the exposure period of the latter short time exposure imaging.

Specifically, in a range of time of the signal output period after the exposure termination of each line of the previous short time exposure imaging or more and exposure time of each line of the previous short time exposure imaging or less among two continuous short time exposure imaging among a plurality of times of short time exposure imaging, the exposure start timing of each line of the latter short time exposure imaging may be shifted relative to the exposure start timing of the former short time exposure imaging.

The unexposed period is eliminated in this manner, so that it is possible to make synthetic image data that is generated after termination of the second and subsequent short time exposure imaging not inferior to the image obtained with the first time of exposure, and realize high quality of long time exposure imaging.

In addition, in the variation example, with respect to the data to be recorded in the memory card 11, similarly to the imaging apparatus 100 shown in FIG. 1, at least one of the captured image data and the synthetic image data generated at a time when the imaging termination instruction is made or a time when all of the short time exposure imaging is terminated may be recorded.

Further, the brightness control of the image displayed on the display section 14 may be performed similarly to the imaging apparatus 100 shown in FIG. 1.

Figure 10:
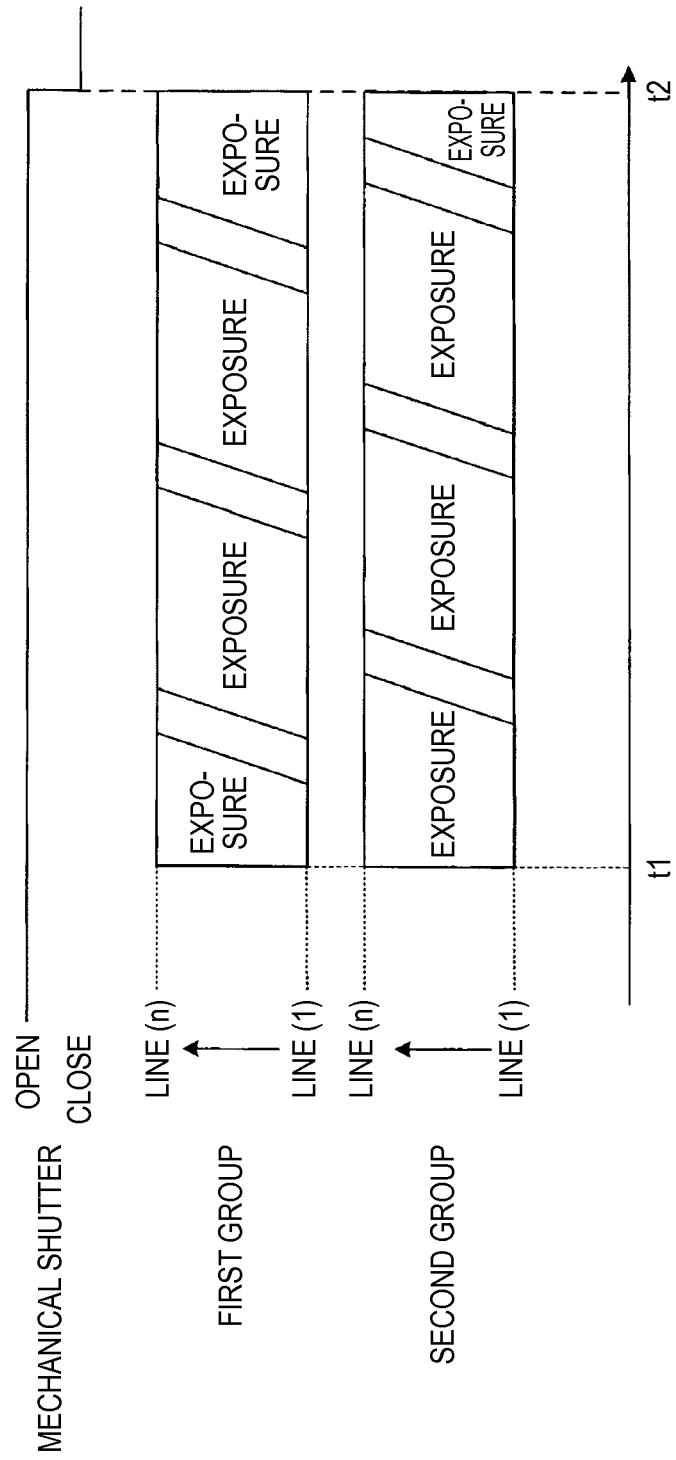
FIG. 10 is a view illustrating a modification example of a timing chart in a case of the long time exposure imaging operation of the imaging apparatus 100 in which the imaging element 5' shown in FIG. 8 is installed.

Further, the driving shown in FIG. 5 can be employed even in the driving shown in FIG. 9. That is, as shown in FIG. 10, the exposure start time t1 of the first time and second time of short time exposure imaging may be controlled by performing the global reset which simultaneously resets the accumulated charges in all lines of the first group and all lines of the second group, and the exposure termination time t2 of the seventh time and eighth time of short time exposure imaging may be controlled by performing the driving to close the mechanical shutter 3.

Figure 11:
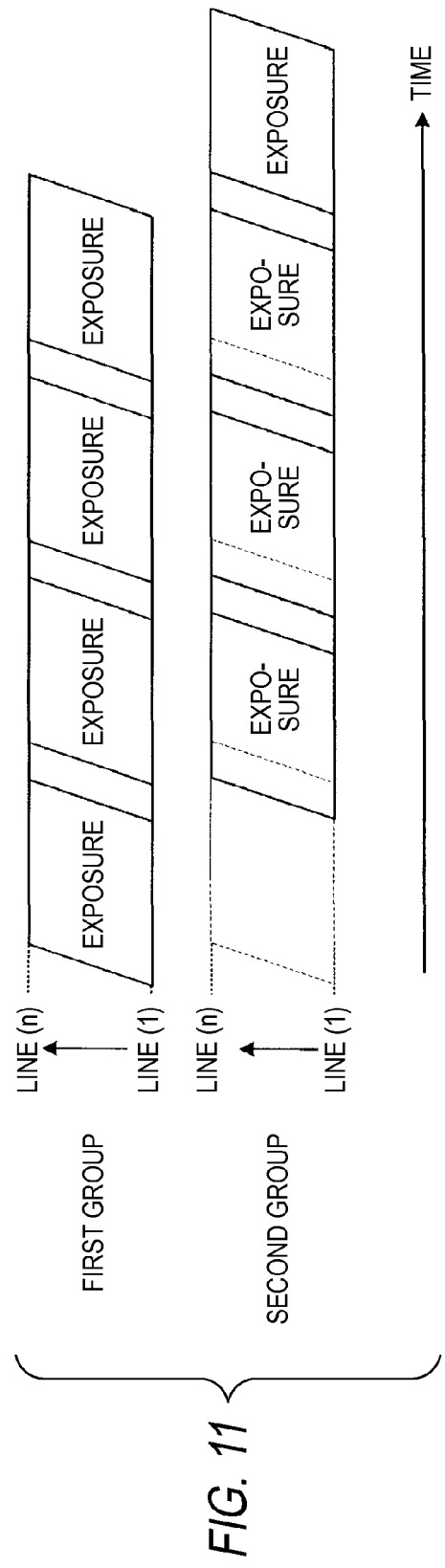
FIG. 11 is a view illustrating a modification example of a timing chart in a case of the long time exposure imaging operation of the imaging apparatus 100 in which the imaging element 5' shown in FIG. 8 is installed.

In addition, as shown in FIG. 11, the driving shown in FIG. 9 can be modified to the driving in which the exposure period of the odd number of times of short time exposure imaging and the exposure period of the even number of times of short time exposure imaging are not overlapped with each other.

In the driving shown in FIG. 11, in a case of employing the driving shown in FIG. 5 (the driving to achieve no distortion of the image), the exposure start time of the first time of short time exposure imaging may be controlled by performing the global reset which simultaneously resets the accumulated charges in all lines of the first group and the exposure termination time of the eighth time of short time exposure imaging may be controlled by performing the driving to close the mechanical shutter 3. With respect to the second time to seventh time of short time exposure imaging, the exposure start and the exposure termination timing may be controlled by the rolling reset and the rolling reading.

In this manner, the exposure start of at least the first time of short time exposure imaging out of the first time and the second time of short time exposure imaging is controlled by the global reset, and the exposure termination of at least the eighth time of short time exposure imaging out of the seventh time and the eighth time of short time exposure imaging is controlled by closing the mechanical shutter 3. In this manner, with respect to the synthetic image data obtained by synthesizing eight captured image data obtained by eight times of the short time exposure imaging, each of the exposure start timing and the exposure termination timing are coincident in all images, and no distortion can be achieved even in the moving object.

In a case of employing the driving shown in FIG. 10, similarly to the case of employing FIG. 5, the unevenness in brightness occurs in the column direction Y in the captured image data obtained with the first time and the second time of short time exposure imaging and the captured image data obtained with the seventh time and the eighth time of short time exposure imaging. For this reason, it is preferable that the image processing section 9 correct the unevenness in brightness, similarly to the above description.

In addition, the number of the short time exposure imaging performed in the driving shown in FIGS. 9 to 11 may also be determined according to the aperture value.

In the driving shown in FIGS. 9 to 11, it is necessary to set the same time from the start of the exposure of the first time of short time exposure imaging to the termination of the exposure of the eighth time of short time exposure imaging as the exposure time that is set for long time exposure imaging.

That is, if the exposure time for long time exposure imaging is determined, among a plurality of times of short time exposure imaging, the exposure start timing of the first short time exposure imaging and the exposure termination timing of the last short time exposure imaging are determined. For this reason, the device control section 8 may determine the number of the short time exposure imaging, in order for the unexposed period not to occur, in response to the aperture value, within the period from the start of the first short time exposure imaging to the termination of the last short time exposure imaging.

Further, in FIGS. 8 to 11, an odd number of times of short time exposure imaging is performed with the first group, but the odd number of times of short time exposure imaging may be performed in the second group and the even number of times of short time exposure imaging may be performed in the first group.

Figure 12:
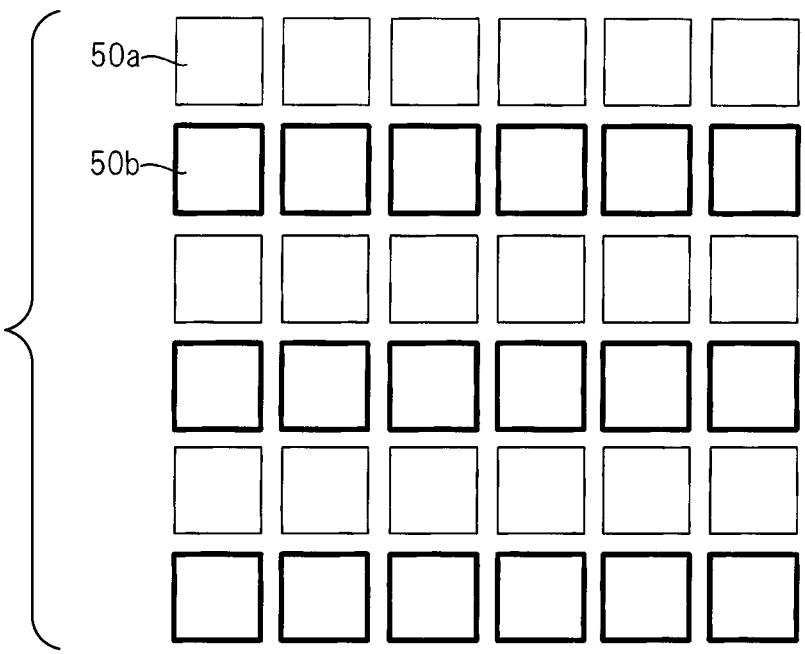
FIG. 12 is a view illustrating a modification example of the imaging element shown in FIG. 8.
Figure 13:
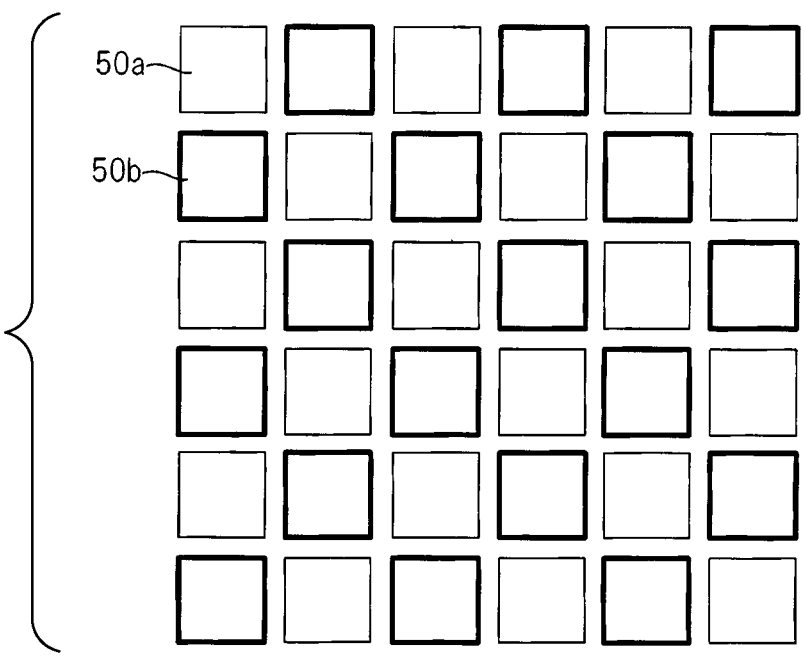
FIG. 13 is a view illustrating a modification example of the imaging element shown in FIG. 8.

Further, the arrangement of the photoelectric conversion elements of the imaging element 5' may be the arrangement shown in FIG. 12 and FIG. 13.

FIG. 12 is a view illustrating a modification example of the imaging element shown in FIG. 8. In the imaging element in the modification example, a plurality of photoelectric conversion elements are arranged in a square lattice shape, among the photoelectric conversion elements, the odd number of rows are set as the photoelectric conversion elements 50a and the even number of rows are set as the photoelectric conversion elements 50b.

FIG. 13 is a view illustrating a modification example of the imaging element shown in FIG. 8. The imaging element in the modification example has a configuration in which a plurality of photoelectric conversion elements are arranged in a square lattice shape, among the photoelectric conversion elements, the photoelectric conversion elements 50a are arranged in one checkered position and the photoelectric conversion elements 50b are arranged in another checkered position.

Even in the arrangements of the photoelectric conversion element shown in FIG. 12 and FIG. 13, since the correlation between the image captured with the first group and the image captured with the second group is high, by performing the driving described in FIGS. 9 to 11, it is possible to achieve an effect to confirm the image during the long time exposure imaging, an effect to eliminate the distortion, and the like.

As described heretofore, the following is disclosed in the present specification.

A disclosed imaging apparatus comprises: an imaging element; a display section; an imaging control section which causes the imaging element to perform a plurality of times of imaging; and a display control section which causes an image obtained with a first time of imaging to be displayed on the display section when the first time of imaging is terminated, and causes a synthetic image of an image obtained with each of second and subsequent imaging and an image obtained with all imaging prior to each of second and subsequent imaging among the plurality of times of imaging to be displayed on the display section whenever each of second and subsequent imaging is terminated.

It is the disclosed imaging apparatus in which the imaging element is a MOS type including a plurality of lines of photoelectric conversion elements, further comprising: a mechanical shutter provided in a light incident side of the imaging element, in which the imaging element, in which in a case of the first time of imaging among the plurality of times of imaging, the imaging control section causes an exposure to be simultaneously started in each line, and causes an exposure to be terminated by performing a rolling reading which reads out a signal corresponding to an accumulated charge of the photoelectric conversion element at a shifted timing for each line, in a case of the last imaging among the plurality of times of imaging, the imaging control section causes an exposure to be started by performing a rolling reset which resets the accumulated charge of the photoelectric conversion element at a shifted timing for each line, and causes an exposure to be simultaneously terminated in each line by closing the mechanical shutter, and in a case of imaging other than the first time of imaging and the last imaging among the plurality of times of imaging, the imaging control section causes an exposure to be started by performing the rolling reset, and causes an exposure to be terminated by performing the rolling reading.

It is the disclosed imaging apparatus in which the display control section causes an image of which unevenness due to a variation of an exposure time for each line in the first time of imaging is corrected to be displayed as the image obtained with the first time of imaging on the display section when the first time of imaging is terminated, and causes the synthetic image of which unevenness due to a variation of an exposure time for each line in the first time of imaging and unevenness due to a variation of an exposure time for each line in the last imaging are corrected to be displayed on the display section when the last imaging is terminated.

It is the disclosed imaging apparatus in which with respect to an image to be displayed after imaging other than the last imaging among the plurality of times of imaging or the synthetic image, the display control section causes the image having further increased brightness than an original image to be displayed, and the smaller the implementation number of imaging other than the last imaging is, the higher an increased degree of the brightness is.

It is the disclosed imaging apparatus in which the imaging element includes a first group having a plurality of photoelectric conversion elements and a second group having a plurality of photoelectric conversion elements, in which the imaging control section causes the first group to perform imaging with respect to an odd number of times of imaging among the plurality of times of imaging, causes the second group to perform imaging with respect to an even number of times of imaging among the plurality of times of imaging, and causes the imaging element to perform the plurality of times of imaging, such that in two consecutive imaging among the plurality of times of imaging, a period necessary for output of a signal obtained by an exposure of former imaging is included in an exposure period of latter imaging.

It is the disclosed imaging apparatus, further comprising: a mechanical shutter provided in a light incident side of the imaging element, in which the imaging element is a MOS type, in which in a case of at least a first time of imaging among the first time of imaging and subsequent imaging, among the plurality of times of imaging, the imaging control section causes an exposure to be simultaneously started in each line of the photoelectric conversion element, and causes an exposure to be terminated by performing a rolling reading which reads out a signal corresponding to an accumulated charge of the photoelectric conversion element at a shifted timing for each line, in a case of at least last imaging among the last imaging and immediately previous imaging, among the plurality of times of imaging, the imaging control section causes an exposure to be started by performing a rolling reset which resets the accumulated charge of the photoelectric conversion element at a shifted timing for each line, and causes an exposure to be simultaneously terminated in all the lines by closing the mechanical shutter, and in a case of the imaging other than at least the first time of imaging among the first time of imaging and subsequent imaging, and at least the last imaging among the last imaging and immediately previous imaging, among the plurality of times of imaging, the imaging control section causes an exposure to be started by performing the rolling reset, and causes an exposure to be terminated by performing the rolling reading.

It is the disclosed imaging apparatus in which the display control section causes an image of which unevenness due to a variation of an exposure time for each line of the first group in the first time of imaging is corrected to be displayed as the image obtained with the first time of imaging on the display section when the first time of imaging is terminated, and causes the synthetic image of which unevenness due to a variation of an exposure time for each line of the first group in the first time of imaging and unevenness due to a variation of an exposure time for each line of the second group in the last imaging are corrected to be displayed on the display section when the last imaging is terminated.

It is the disclosed imaging apparatus in which with respect to an image to be displayed after imaging other than the last imaging among the plurality of times of imaging or the synthetic image, the display control section causes the image having further increased brightness than an original image to be displayed, and the smaller an implementation number of imaging other than the last imaging is, the higher an increased degree of the brightness is.

It is the disclosed imaging apparatus, further comprising: a captured image data generating section which generates captured image data using a captured image signal to be output from the imaging device with the imaging whenever each of the plurality of times of imaging is terminated; a synthetic image data generating section which generates synthetic image data obtained by synthesizing the captured image data that is generated with each of second and subsequent imaging and all imaging prior to each imaging, whenever each imaging is terminated; and a recording section which records the synthetic image data in a recording media, the synthetic image data being generated at a time when all of the plurality of times of imaging is terminated or an instruction to stop the plurality of times of imaging in the middle of the imaging is given.

It is the disclosed imaging apparatus in which the imaging control section changes the number of times of the plurality of times of imaging according to an aperture value.

A disclosed imaging apparatus comprises: a MOS type imaging element including a plurality of lines of photoelectric conversion elements; an imaging control section which causes the imaging element to perform a plurality of times of imaging; a synthetic image data generating section which generates synthetic image data by synthesizing a plurality of captured image data that is obtained by processing each of a plurality of captured image signals to be output from the imaging element with the plurality of times of imaging; a recording section which records the synthetic image data in a recording media; and a mechanical shutter provided in a light incident side of the imaging element, in which in a case of a first time of imaging among the plurality of times of imaging, the imaging control section causes an exposure to be simultaneously started in each line, and causes an exposure to be terminated by performing a rolling reading which reads out a signal corresponding to an accumulated charge of the photoelectric conversion element at a shifted timing for each line, in a case of the last imaging among the plurality of times of imaging, the imaging control section causes an exposure to be started by performing a rolling reset which resets the accumulated charge of the photoelectric conversion element at a shifted timing for each line, and causes an exposure to be simultaneously terminated in all the line by closing the mechanical shutter, and in a case of the imaging other than the first time of imaging and the last imaging among the plurality of times of imaging, the imaging control section causes an exposure to be started by performing the rolling reset, and causes an exposure to be terminated by performing the rolling reading.

A disclosed imaging apparatus comprises: an imaging element including a first group having a plurality of photoelectric conversion elements and a second group having a plurality of photoelectric conversion elements; an imaging control section which causes the imaging element to perform a plurality of times of imaging; a synthetic image data generating section which generates synthetic image data by synthesizing a plurality of captured image data that is obtained by processing each of a plurality of captured image signals that is output from the imaging element with the plurality of times of imaging; and a recording section which records the synthetic image data in a recording media, in which the imaging control section causes the first group to perform imaging with respect to an odd number of times of imaging among the plurality of times of imaging, causes the second group to perform imaging with respect to an even number of times of imaging among the plurality of times of imaging, and causes the imaging element to perform the plurality of times of imaging, such that in two consecutive imaging among the plurality of times of imaging, a period necessary for output of a signal obtained by an exposure of former imaging is included in an exposure period of latter imaging.

It is the imaging apparatus, further comprising: a mechanical shutter provided in a light incident side of the imaging element, in which the imaging element is a MOS type, in which in a case of at least a first time of imaging among the first time of imaging and subsequent imaging among the plurality of times of imaging, the imaging control section causes an exposure to be simultaneously started in each line of the photoelectric conversion element, and causes an exposure to be terminated by performing a rolling reading which reads out a signal corresponding to an accumulated charge of the photoelectric conversion element at a shifted timing for each line, in a case of at least last imaging among the last imaging and immediately previous imaging among the plurality of times of imaging, the imaging control section causes an exposure to be started by performing a rolling reset which resets the accumulated charge of the photoelectric conversion element at a shifted timing for each line, and causes an exposure to be simultaneously terminated in all the lines by closing the mechanical shutter, and in a case of the imaging other than at least the first time of imaging among the first time of imaging, and subsequent imaging and at least the last imaging among the last imaging and immediately previous imaging, among the plurality of times of imaging, the imaging control section causes an exposure to be started by performing the rolling reset, and causes an exposure to be terminated by performing the rolling reading.

It is the disclosed imaging apparatus in which the imaging control section changes the number of times of the plurality of times of imaging according to an aperture value.

A disclosed imaging method comprises: an imaging control step which causes an imaging element to perform a plurality of times of imaging; and a display control step which causes an image obtained with a first time of imaging to be displayed on the display section when the first time of imaging is terminated, and causes a synthetic image of an image obtained with each of second and subsequent imaging and an image obtained with all imaging prior to each of second and subsequent imaging among the plurality of times of imaging to be displayed on the display section whenever each of second and subsequent imaging is terminated.

It is the disclosed imaging method in which the imaging element is a MOS type including a plurality of lines of photoelectric conversion elements, in which in the imaging control step, in a case of the first time of imaging among the plurality of times of imaging, an exposure is caused to be simultaneously started in each line, and an exposure is caused to be terminated by performing a rolling reading which reads out a signal corresponding to an accumulated charge of the photoelectric conversion element at a shifted timing for each line, in a case of the last imaging among the plurality of times of imaging, an exposure is caused to be started by performing a rolling reset which resets the accumulated charge of the photoelectric conversion step at a shifted timing for each line, and an exposure is caused to be simultaneously terminated in each line by closing the mechanical shutter provided in a light incident side of the imaging element, and in a case of the imaging other than the first time of imaging and the last imaging among the plurality of times of imaging, an exposure is caused to be started by performing the rolling reset, and an exposure is caused to be terminated by performing the rolling reading.

It is the disclosed imaging method in which in the display control step, an image of which unevenness due to a variation of an exposure time for each line in the first time of imaging is corrected, is caused to be displayed as the image obtained with the first time of imaging on the display section when the first time of imaging is terminated, and the synthetic image of which unevenness due to a variation of an exposure time for each line in the first time of imaging and unevenness due to a variation of an exposure time for each line in the last imaging are corrected, is caused to be displayed on the display section when the last imaging is terminated.

It is the disclosed imaging method in which in the display control step, with respect to an image to be displayed after imaging other than the last imaging among the plurality of times of imaging or the synthetic image, the image having further increased brightness than an original image is caused to be displayed, and the smaller an implementation number of imaging other than the last imaging is, the higher an increased degree of the brightness is.

It is the disclosed imaging method in which the imaging element includes a first group having a plurality of photoelectric conversion elements and a second group having a plurality of photoelectric conversion elements, in which in the imaging control step, the first group is caused to perform imaging with respect to an odd number of times of imaging among the plurality of times of imaging, the second group is caused to perform imaging with respect to an even number of times of imaging among the plurality of times of imaging, and the imaging element is caused to perform the plurality of times of imaging, such that in two consecutive imaging among the plurality of times of imaging, a period necessary for output of a signal obtained by an exposure of former imaging is included in an exposure period of latter imaging.

It is the disclosed imaging method in which the imaging element is a MOS type, in which in the imaging control step, in a case of at least a first time of imaging among the first time of imaging and subsequent imaging, among the plurality of times of imaging, an exposure is caused to be simultaneously started in each line of the photoelectric conversion step, and an exposure is caused to be terminated by performing a rolling reading which reads out a signal corresponding to an accumulated charge of the photoelectric conversion step at a shifted timing for each line, in a case of at least last imaging among the last imaging and immediately previous imaging, among the plurality of times of imaging, an exposure is caused to be started by performing a rolling reset which resets the accumulated charge of the photoelectric conversion element at a shifted timing for each line, and an exposure is caused to be simultaneously terminated in each line by closing the mechanical shutter, and in a case of the imaging other than at least the first time of imaging among the first time of imaging and subsequent imaging, and at least the last imaging among the last imaging and immediately previous imaging, among the plurality of times of imaging, an exposure is caused to be started by performing the rolling reset, and an exposure is caused to be terminated by performing the rolling reading.

It is the disclosed imaging method in which in the display control step, an image of which unevenness due to a variation of an exposure time for each line of the first group in the first time of imaging is corrected, is caused to be displayed as the image obtained with the first time of imaging on the display section when the first time of imaging is terminated, and the synthetic image of which unevenness due to a variation of an exposure time for each line of the first group in the first time of imaging and unevenness due to a variation of an exposure time for each line of the second group in the last imaging are corrected, is caused to be displayed on the display section when the last imaging is terminated.

It is the disclosed imaging method in which in the display control step, with respect to an image to be displayed after imaging other than the last imaging among the plurality of times of imaging or the synthetic image, the image having further increased brightness than an original image is caused to be displayed, and the smaller an implementation number of imaging other than the last imaging is, the higher an increased degree of the brightness is.

It is the disclosed imaging method, further comprising: a captured image data generating step which generates captured image data using a captured image signal to be output from the imaging device with the imaging whenever each of the plurality of times of imaging is terminated; a synthetic image data generating step which generates synthetic image data obtained by synthesizing the captured image data that is generated with each of second and subsequent imaging and all imaging prior to each imaging, whenever each imaging is terminated; and a recording step which records the synthetic image data in a recording medium, the synthetic image data being generated at a time when all of the plurality of times of imaging is terminated or an instruction to stop the plurality of times of imaging in the middle of the imaging is given.

It is the imaging method, in which in the imaging control step, the number of times of the plurality of times of imaging is changed according to an aperture value.

An disclosed imaging method comprises: an imaging control step which causes a MOS type imaging element including a plurality of lines of a photoelectric conversion element to perform a plurality of times of imaging; a synthetic image data generating step which generates synthetic image data by synthesizing a plurality of captured image data that is obtained by processing each of a plurality of captured image signals to be output from the imaging element with the plurality of times of imaging; and a recording step which records the synthetic image data in a recording media; in which in the imaging control step, in a case of a first time of imaging among the plurality of times of imaging, an exposure is caused to be simultaneously started in each line, and an exposure is caused to be terminated by performing a rolling reading which reads out a signal corresponding to an accumulated charge of the photoelectric conversion element at a shifted timing for each line, in a case of the last imaging among the plurality of times of imaging, an exposure is caused to be started by performing a rolling reset which resets the accumulated charge of the photoelectric conversion element at a shifted timing for each line, and an exposure is caused to be simultaneously terminated in each line by closing the mechanical shutter, and in a case of the imaging other than the first time of imaging and the last imaging among the plurality of times of imaging, an exposure is caused to be started by performing the rolling reset, and an exposure is caused to be terminated by performing the rolling reading.

A disclosed imaging method comprises: an imaging control step which causes an imaging element including a first group having a plurality of photoelectric conversion elements and a second group having a plurality of photoelectric conversion elements to perform a plurality of times of imaging; a synthetic image data generating step which generates synthetic image data by synthesizing a plurality of captured image data that is obtained by processing each of a plurality of captured image signals to be output from the imaging element with the plurality of times of imaging; and a recording step which records the synthetic image data in a recording media, in which in the imaging control step, the first group is caused to perform imaging with respect to an odd number of times of imaging among the plurality of times of imaging, the second group is caused to perform imaging with respect to an even number of times of imaging among the plurality of times of imaging, and the imaging element is caused to perform the plurality of times of imaging, such that in two consecutive imaging among the plurality of times of imaging, a period necessary for output of a signal obtained by an exposure of former imaging is included in an exposure period of latter imaging.

It is the disclosed imaging method in which the imaging element is a MOS type, in which in the imaging control step, in a case of at least a first time of imaging among the first time of imaging and subsequent imaging, among the plurality of times of imaging, an exposure is caused to be simultaneously started in each line of the photoelectric conversion element, and an exposure is caused to be terminated by performing a rolling reading which reads out a signal corresponding to an accumulated charge of the photoelectric conversion element at a shifted timing for each line, in a case of at least last imaging among the last imaging and immediately previous imaging, among the plurality of times of imaging, an exposure is caused to be started by performing a rolling reset which resets the accumulated charge of the photoelectric conversion element at a shifted timing for each line, and an exposure is caused to be simultaneously terminated in all the lines by closing the mechanical shutter, and in a case of the imaging other than at least the first time of imaging among the first time of imaging and subsequent imaging, and at least the last imaging among the last imaging and immediately previous imaging, among the plurality of times of imaging, an exposure is caused to be started by performing the rolling reset, and an exposure is caused to be terminated by performing the rolling reading.

It is the disclosed imaging method in which in the imaging control step, the number of times of the plurality of times of imaging is changed according to an aperture value.

INDUSTRIAL APPLICABILITY

According to the present invention, it is possible to provide an imaging apparatus and an imaging method in which the user can confirm in real time an image that is being captured during long time exposure imaging. Further, according to the present invention, it is possible to provide an imaging apparatus and an imaging method in which high quality of long time exposure imaging can be simply performed.

Although the present invention is described in detail or referring to a specific embodiment, it is obvious to those skilled in the art that many modification or variations can be made without departing from the spirit and the scope of the present invention.

The application is based on Japanese application filed on 14 of Sep., 2010 (Japanese Patent Application No. 2010-206107) of which the content is incorporated herein by reference.

REFERENCE SIGNS LIST 5 imaging element
8 device control section
13 driver
15 encoder

The invention claimed is:

1. An imaging apparatus comprising:
an imaging element including a first group having a plurality of photoelectric conversion elements and a second group having a plurality of photoelectric conversion elements;
an imaging control section which causes the imaging element to perform a plurality of times of imaging;
a synthetic image data generating section which generates synthetic image data by synthesizing a plurality of captured image data that is obtained by processing each of a plurality of captured image signals that is output from the imaging element with the plurality of times of imaging; and
a recording section which records the synthetic image data in a recording media,
wherein the imaging control section causes the first group to perform imaging with respect to an odd number of times of imaging among the plurality of times of imaging, causes the second group to perform imaging with respect to an even number of times of imaging among the plurality of times of imaging, and causes the imaging element to perform the plurality of times of imaging, such that in two consecutive imaging among the plurality of times of imaging, a period necessary for output of a signal obtained by an exposure of former imaging is included in an exposure period of latter imaging,
wherein the imaging apparatus further comprises a mechanical shutter provided in a light incident side of the imaging element,
wherein the imaging element is a MOS type, and
wherein in a case of at least a first time of imaging among the first time of imaging and subsequent imaging among the plurality of times of imaging, the imaging control section causes an exposure to be simultaneously started in each line of the photoelectric conversion element, and causes an exposure to be terminated by performing a rolling reading which reads out a signal corresponding to an accumulated charge of the photoelectric conversion element at a shifted timing for each line,
in a case of at least last imaging among the last imaging and immediately previous imaging among the plurality of times of imaging, the imaging control section causes an exposure to be started by performing a rolling reset which resets the accumulated charge of the photoelectric conversion element at a shifted timing for each line, and causes an exposure to be simultaneously terminated in each line by closing the mechanical shutter, and
in a case of the imaging other than at least the first time of imaging among the first time of imaging, and subsequent imaging and at least the last imaging among the last imaging and immediately previous imaging, among the plurality of times of imaging, the imaging control section causes an exposure to be started by performing the rolling reset, and causes an exposure to be terminated by performing the rolling reading.

2. The imaging apparatus according to claim 1,
wherein the imaging control section changes the number of times of the plurality of times of imaging according to an aperture value.

3. An imaging apparatus comprising:
an imaging element which is a MOS type, including a plurality of lines of photoelectric conversion elements;
a display section;
an imaging control section which causes the imaging element to perform a plurality of times of imaging;
a display control section which causes an image obtained with a first time of imaging to be displayed on the display section when the first time of imaging is terminated, and causes a synthetic image of an image obtained with each of second and subsequent imaging and an image obtained with all imaging prior to each of second and subsequent imaging among the plurality of times of imaging to be displayed on the display section whenever each of second and subsequent imaging is terminated; and
a mechanical shutter provided in a light incident side of the imaging element,
wherein in a case of the first time of imaging among the plurality of times of imaging, the imaging control section causes an exposure to be simultaneously started in each line, and causes an exposure to be terminated by performing a rolling reading which reads out a signal corresponding to an accumulated charge of the photoelectric conversion element at a shifted timing for each line,
in a case of the last imaging among the plurality of times of imaging, the imaging control section causes an exposure to be started by performing a rolling reset which resets the accumulated charge of the photoelectric conversion element at a shifted timing for each line, and causes an exposure to be simultaneously terminated in each line by closing the mechanical shutter, and
in a case of imaging other than the first time of imaging and the last imaging among the plurality of times of imaging, the imaging control section causes an exposure to be started by performing the rolling reset, and causes an exposure to be terminated by performing the rolling reading.

4. The imaging apparatus according to claim 3,
wherein the display control section causes an image of which unevenness due to a variation of an exposure time for each line in the first time of imaging is corrected to be displayed as the image obtained with the first time of imaging on the display section when the first time of imaging is terminated, and causes the synthetic image of which unevenness due to a variation of an exposure time for each line in the first time of imaging and unevenness due to a variation of an exposure time for each line in the last imaging are corrected to be displayed on the display section when the last imaging is terminated.

5. The imaging apparatus according to claim 3,
wherein with respect to an image to be displayed after imaging other than the last imaging among the plurality of times of imaging or the synthetic image, the display control section causes the image having further increased brightness than an original image to be displayed, and the smaller the implementation number of imaging other than the last imaging is, the higher an increased degree of the brightness is.

6. The imaging apparatus according to claim 3, further comprising:
a captured image data generating section which generates captured image data using a captured image signal to be output from the imaging device with the imaging whenever each of the plurality of times of imaging is terminated;
a synthetic image data generating section which generates synthetic image data obtained by synthesizing the captured image data that is generated with each of second and subsequent imaging and all imaging prior to each imaging, whenever each imaging is terminated; and a recording section which records the synthetic image data in a recording media, the synthetic image data being generated at a time when all of the plurality of times of imaging is terminated or an instruction to stop the plurality of times of imaging in the middle of the imaging is given.

7. The imaging apparatus according to claim 3, wherein the imaging control section changes the number of times of the plurality of times of imaging according to an aperture value.

8. An imaging apparatus, an imaging element which is a MOS type, including a first group having a plurality of photoelectric conversion elements and a second group having a plurality of photoelectric conversion elements;
a mechanical shutter provided in a light incident side of the imaging element;
a display section; and
an imaging control section which causes the imaging element to perform a plurality of times of imaging;
a display control section which causes an image obtained with a first time of imaging to be displayed on the display section when the first time of imaging is terminated, and causes a synthetic image of an image obtained with each of second and subsequent imaging and an image obtained with all imaging prior to each of second and subsequent imaging among the plurality of times of imaging to be displayed on the display section whenever each of second and subsequent imaging is terminated,
wherein the imaging control section causes the first group to perform imaging with respect to an odd number of times of imaging among the plurality of times of imaging, causes the second group to perform imaging with respect to an even number of times of imaging among the plurality of times of imaging, and causes the imaging element to perform the plurality of times of imaging, such that in two consecutive imaging among the plurality of times of imaging, a period necessary for output of a signal obtained by an exposure of former imaging is included in an exposure period of latter imaging,
wherein in a case of at least a first time of imaging among the first time of imaging and subsequent imaging, among the plurality of times of imaging, the imaging control section causes an exposure to be simultaneously started in each line of the photoelectric conversion element, and causes an exposure to be terminated by performing a rolling reading which reads out a signal corresponding to an accumulated charge of the photoelectric conversion element at a shifted timing for each line,
in a case of at least last imaging among the last imaging and immediately previous imaging, among the plurality of times of imaging, the imaging control section causes an exposure to be started by performing a rolling reset which resets the accumulated charge of the photoelectric conversion element at a shifted timing for each line, and causes an exposure to be simultaneously terminated in each line by closing the mechanical shutter, and
in a case of the imaging other than at least the first time of imaging among the first time of imaging and subsequent imaging, and at least the last imaging among the last imaging and immediately previous imaging, among the plurality of times of imaging, the imaging control section causes an exposure to be started by performing the rolling reset, and causes an exposure to be terminated by performing the rolling reading.

9. The imaging apparatus according to claim 8, wherein the display control section causes an image of which unevenness due to a variation of an exposure time for each line of the first group in the first time of imaging is corrected to be displayed as the image obtained with the first time of imaging on the display section when the first time of imaging is terminated, and causes the synthetic image of which unevenness due to a variation of an exposure time for each line of the first group in the first time of imaging and unevenness due to a variation of an exposure time for each line of the second group in the last imaging are corrected to be displayed on the display section when the last imaging is terminated.

10. The imaging apparatus according to claim 8, wherein with respect to an image to be displayed after imaging other than the last imaging among the plurality of times of imaging or the synthetic image, the display control section causes the image having further increased brightness than an original image to be displayed, and the smaller an implementation number of imaging other than the last imaging is, the higher an increased degree of the brightness is.

11. An imaging apparatus comprising:
a MOS type imaging element including a plurality of lines of a photoelectric conversion element;
an imaging control section which causes the imaging element to perform a plurality of times of imaging;
a synthetic image data generating section which generates synthetic image data by synthesizing a plurality of captured image data that is obtained by processing each of a plurality of captured image signals to be output from the imaging element with the plurality of times of imaging;
a recording section which records the synthetic image data in a recording media; and
a mechanical shutter provided in a light incident side of the imaging element,
wherein in a case of a first time of imaging among the plurality of times of imaging, the imaging control section causes an exposure to be simultaneously started in each line, and causes an exposure to be terminated by performing a rolling reading which reads out a signal corresponding to an accumulated charge of the photoelectric conversion element at a shifted timing for each line,
in a case of the last imaging among the plurality of times of imaging, the imaging control section causes an exposure to be started by performing a rolling reset which resets the accumulated charge of the photoelectric conversion element at a shifted timing for each line, and causes an exposure to be simultaneously terminated in each line by closing the mechanical shutter, and
in a case of the imaging other than the first time of imaging and the last imaging among the plurality of times of imaging, the imaging control section causes an exposure to be started by performing the rolling reset, and causes an exposure to be terminated by performing the rolling reading.

12. The imaging apparatus according to claim 11, wherein the imaging control section changes the number of times of the plurality of times of imaging according to an aperture value.

13. An imaging method comprising:
an imaging control step which causes an imaging element which is a MOS type, including a first group having a plurality of photoelectric conversion elements and a second group having a plurality of photoelectric conversion elements, to perform a plurality of times of imaging;

a synthetic image data generating step which generates synthetic image data by synthesizing a plurality of captured image data that is obtained by processing each of a plurality of captured image signals to be output from the imaging element with the plurality of times of imaging; and a recording step which records the synthetic image data in a recording media, wherein in the imaging control step, the first group is caused to perform imaging with respect to an odd number of times of imaging among the plurality of times of imaging, the second group is caused to perform imaging with respect to an even number of times of imaging among the plurality of times of imaging, and the imaging element is caused to perform the plurality of times of imaging, such that in two consecutive imaging among the plurality of times of imaging, a period necessary for output of a signal obtained by an exposure of former imaging is included in an exposure period of latter imaging, wherein in the imaging control step, in a case of at least a first time of imaging among the first time of imaging and subsequent imaging, among the plurality of times of imaging, an exposure is caused to be simultaneously started in each line of the photoelectric conversion element, and an exposure is caused to be terminated by performing a rolling reading which reads out a signal corresponding to an accumulated charge of the photoelectric conversion element at a shifted timing for each line, in a case of at least last imaging among the last imaging and immediately previous imaging, among the plurality of times of imaging, an exposure is caused to be started by performing a rolling reset which resets the accumulated charge of the photoelectric conversion element at a shifted timing for each line, and an exposure is caused to be simultaneously terminated in each line by closing the mechanical shutter, and in a case of the imaging other than at least the first time of imaging among the first time of imaging and subsequent imaging, and at least the last imaging among the last imaging and immediately previous imaging, among the plurality of times of imaging, an exposure is caused to be started by performing the rolling reset, and an exposure is caused to be terminated by performing the rolling reading.

14. The imaging method according to claim 13,
wherein in the imaging control step, the number of times of the plurality of times of imaging is changed according to an aperture value.

15. An imaging method comprising:
an imaging control step which causes an imaging element which is a MOS type, including a plurality of lines of photoelectric conversion elements, to continuously perform a plurality of times of imaging; and a display control step which causes an image obtained with a first time of imaging to be displayed on the display section when the first time of imaging is terminated, and causes a synthetic image of an image obtained with each of second and subsequent imaging and an image obtained with all imaging prior to each of second and subsequent imaging among the plurality of times of imaging to be displayed on the display section whenever each of second and subsequent imaging is terminated, wherein in the imaging control step,
in a case of the first time of imaging among the plurality of times of imaging, an exposure is caused to be simultaneously started in each line, and an exposure is caused to be terminated by performing a rolling reading which reads out a signal corresponding to an accumulated charge of the photoelectric conversion element at a shifted timing for each line, in a case of the last imaging among the plurality of times of imaging, an exposure is caused to be started by performing a rolling reset which resets the accumulated charge of the photoelectric conversion step at a shifted timing for each line, and an exposure is caused to be simultaneously terminated in each line by closing the mechanical shutter provided in a light incident side of the imaging element, and in a case of the imaging other than the first time of imaging and the last imaging among the plurality of times of imaging, an exposure is caused to be started by performing the rolling reset, and an exposure is caused to be terminated by performing the rolling reading.

16. The imaging method according to claim 15,
wherein in the display control step, an image of which unevenness due to a variation of an exposure time for each line in the first time of imaging is corrected, is caused to be displayed as the image obtained with the first time of imaging on the display section when the first time of imaging is terminated, and the synthetic image of which unevenness due to a variation of an exposure time for each line in the first time of imaging and unevenness due to a variation of an exposure time for each line in the last imaging are corrected, is caused to be displayed on the display section when the last imaging is terminated.

17. The imaging method according to claim 15,
wherein in the display control step, with respect to an image to be displayed after imaging other than the last imaging among the plurality of times of imaging or the synthetic image, the image having further increased brightness than an original image is caused to be displayed, and the smaller an implementation number of imaging other than the last imaging is, the higher an increased degree of the brightness is.

18. The imaging method according to claim 15, further comprising:
a captured image data generating step which generates captured image data using a captured image signal to be output from the imaging device with the imaging whenever each of the plurality of times of imaging is terminated;

a synthetic image data generating step which generates synthetic image data obtained by synthesizing the captured image data that is generated with each of second and subsequent imaging and all imaging prior to each imaging, whenever each imaging is terminated; and a recording step which records the synthetic image data in a recording medium, the synthetic image data being generated at a time when all of the plurality of times of imaging is terminated or an instruction to stop the plurality of times of imaging in the middle of the imaging is given.

19. The imaging method according to claim 15,
wherein in the imaging control step, the number of times of the plurality of times of imaging is changed according to an aperture value.

20. An imaging method,
an imaging control step which causes an imaging element which is a MOS type, including a first group having a plurality of photoelectric conversion elements and a second group having a plurality of photoelectric conversion elements, to continuously perform a plurality of times of imaging; and a display control step which causes an image obtained with a first time of imaging to be displayed on the display section when the first time of imaging is terminated, and causes a synthetic image of an image obtained with each of second and subsequent imaging and an image obtained with all imaging prior to each of second and subsequent imaging among the plurality of times of imaging to be displayed on the display section whenever each of second and subsequent imaging is terminated, wherein in the imaging control step, the first group is caused to perform imaging with respect to an odd number of times of imaging among the plurality of times of imaging, the second group is caused to perform imaging with respect to an even number of times of imaging among the plurality of times of imaging, and the imaging element is caused to perform the plurality of times of imaging, such that in two consecutive imaging among the plurality of times of imaging, a period necessary for output of a signal obtained by an exposure of former imaging is included in an exposure period of latter imaging, and wherein in the imaging control step, in a case of at least a first time of imaging among the first time of imaging and subsequent imaging, among the plurality of times of imaging, an exposure is caused to be simultaneously started in each line of the photoelectric conversion step, and an exposure is caused to be terminated by performing a rolling reading which reads out a signal corresponding to an accumulated charge of the photoelectric conversion step at a shifted timing for each line, in a case of at least last imaging among the last imaging and immediately previous imaging, among the plurality of times of imaging, an exposure is caused to be started by performing a rolling reset which resets the accumulated charge of the photoelectric conversion element at a shifted timing for each line, and an exposure is caused to be simultaneously terminated in each line by closing the mechanical shutter, and in a case of the imaging other than at least the first time of imaging among the first time of imaging and subsequent imaging, and at least the last imaging among the last imaging and immediately previous imaging, among the plurality of times of imaging, an exposure is caused to be started by performing the rolling reset, and an exposure is caused to be terminated by performing the rolling reading.

21. The imaging method according to claim 20, wherein in the display control step, an image of which unevenness due to a variation of an exposure time for each line of the first group in the first time of imaging is corrected, is caused to be displayed as the image obtained with the first time of imaging on the display section when the first time of imaging is terminated, and the synthetic image of which unevenness due to a variation of an exposure time for each line of the first group in the first time of imaging and unevenness due to a variation of an exposure time for each line of the second group in the last imaging are corrected, is caused to be displayed on the display section when the last imaging is terminated.

22. The imaging method according to claim 20, wherein in the display control step, with respect to an image to be displayed after imaging other than the last imaging among the plurality of times of imaging or the synthetic image, the image having further increased brightness than an original image is caused to be displayed, and the smaller an implementation number of imaging other than the last imaging is, the higher an increased degree of the brightness is.

23. An imaging method comprising:

an imaging control step which causes a MOS type imaging element including a plurality of lines of a photoelectric conversion element to continuously perform a plurality of times of imaging;

a synthetic image data generating step which generates synthetic image data by synthesizing a plurality of captured image data that is obtained by processing each of a plurality of captured image signals to be output from the imaging element with the plurality of times of imaging; and a recording step which records the synthetic image data in a recording media, wherein in the imaging control step, in a case of a first time of imaging among the plurality of times of imaging, an exposure is caused to be simultaneously started in each line, and an exposure is caused to be terminated by performing a rolling reading which reads out a signal corresponding to an accumulated charge of the photoelectric conversion element at a shifted timing for each line, in a case of the last imaging among the plurality of times of imaging, an exposure is caused to be started by performing a rolling reset which resets the accumulated charge of the photoelectric conversion element at a shifted timing for each line, and an exposure is caused to be simultaneously terminated in each line by closing the mechanical shutter, and in a case of the imaging other than the first time of imaging and the last imaging among the plurality of times of imaging, an exposure is caused to be started by performing the rolling reset, and an exposure is caused to be terminated by performing the rolling reading.

24. The imaging method according to claim 23, wherein in the imaging control step, the number of times of the plurality of times of imaging is changed according to an aperture value.

* * * * *